United States Patent
Tsadok et al.

(10) Patent No.: US 9,972,069 B2
(45) Date of Patent: May 15, 2018

(54) SYSTEM AND METHOD FOR MEASUREMENT OF MYOCARDIAL MECHANICAL FUNCTION

(71) Applicant: Technion Research & Development Foundation Limited, Haifa (IL)

(72) Inventors: Yossi Tsadok, Pardes-Hanna (IL); Dan Adam, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 197 days.

(21) Appl. No.: 14/860,873

(22) Filed: Sep. 22, 2015

(65) Prior Publication Data
US 2016/0098833 A1   Apr. 7, 2016

Related U.S. Application Data

(60) Provisional application No. 62/060,041, filed on Oct. 6, 2014.

(51) Int. Cl.
| | |
|---|---|
| *G06K 9/00* | (2006.01) |
| *G06T 3/00* | (2006.01) |
| *G06K 9/62* | (2006.01) |
| *G06K 9/46* | (2006.01) |
| *G06K 9/48* | (2006.01) |
| *G06T 7/38* | (2017.01) |

(52) U.S. Cl.
CPC .......... *G06T 3/0093* (2013.01); *G06K 9/4604* (2013.01); *G06K 9/48* (2013.01); *G06K 9/6201* (2013.01); *G06T 7/38* (2017.01); *G06K 2009/484* (2013.01); *G06K 2209/051* (2013.01); *G06T 2207/10076* (2013.01); *G06T 2207/10081* (2013.01); *G06T 2207/20221* (2013.01); *G06T 2207/30048* (2013.01)

(58) Field of Classification Search
CPC ........ G06T 3/0093; G06T 7/38; G06K 9/4604
See application file for complete search history.

(56) References Cited

U.S. PATENT DOCUMENTS

| | | | | |
|---|---|---|---|---|
| 5,099,846 | A * | 3/1992 | Hardy | A61N 5/1031 378/4 |
| 7,813,535 | B2 * | 10/2010 | Florin | A61B 5/05 378/21 |

(Continued)

*Primary Examiner* — Gregory M Desire
(74) *Attorney, Agent, or Firm* — Alphapatent Associates, Ltd; Daniel J. Swirsky; Ricki L. Simon

(57) ABSTRACT

There is provided a system and method for evaluation of cardiac images, wherein enhanced evaluation of myocardial mechanical function is possible. The system and methods include methods for segmentation of cardiac images obtained via cMRI or other imaging modalities, wherein the segmentation allows for fusion of these images with images obtained from a different modality such as echocardiogram and/or LE-MRI. The fused images may then be used to provide a diagnosis or a recommendation for a procedure, such as implantation of a cardiac pacemaker. Moreover, follow-up evaluation may be done using only one imaging modality, such as echocardiogram, for example. The system and methods disclosed herein further provide additional post-processing, such as computation of mid-myocardial strain, which can further be useful in diagnosis and planning.

28 Claims, 25 Drawing Sheets

(56) References Cited

U.S. PATENT DOCUMENTS

| | | | | |
|---|---|---|---|---|
| 8,335,557 B2 * | 12/2012 | Maschke | ............... | A61B 6/12 |
| | | | | 378/117 |
| 9,142,030 B2 * | 9/2015 | Fei | ............... | G06T 7/0089 |
| 9,384,546 B2 * | 7/2016 | Zheng | ............... | G06T 7/0012 |
| 9,629,615 B1 * | 4/2017 | Tavakoli | ............... | A61B 8/5223 |
| 2005/0059876 A1 * | 3/2005 | Krishnan | ............... | G06T 7/0012 |
| | | | | 600/407 |
| 2006/0173268 A1 * | 8/2006 | Mullick | ............... | A61B 5/055 |
| | | | | 600/407 |
| 2006/0239524 A1 * | 10/2006 | Desh | ............... | G06F 19/321 |
| | | | | 382/128 |
| 2011/0046725 A1 * | 2/2011 | Noettling | ............... | A61B 6/032 |
| | | | | 623/2.11 |

\* cited by examiner

SYSTEM AND METHOD FOR MEASUREMENT OF MYOCARDIAL MECHANICAL FUNCTION

FIELD OF THE INVENTION

The present invention is directed to a system and method for providing measurement of myocardial mechanical function for cardiac diagnostics.

More specifically, the present invention is directed to systems and methods for c-MRI myocardial wall segmentation, strain measurements and fusion with other imaging modalities such as LE-MRI and ultrasound for enhanced measurement of myocardial mechanical function.

BACKGROUND

An increasing number of cardiac patients undergo diagnostic procedures using different modalities, e.g. Ultrasound (US), Magnetic Resonance Imaging (MRI), Echocardiography (ECG), Electrophysiology (EP), etc. The diagnostic information provided by these procedures is often used to select patients for Implantable Cardiac Defibrillators (ICD).

Identification of candidates for ICD has traditionally been based on the electrophysiologic properties of noninfarcted myocardial tissue and the factors that trigger the induction of lethal arrhythmias in these patients. It has been shown, however, that reentrant Ventricular Tachycardia (VT) commonly originates at the interface or the border zone between myocardial scar tissue and preserved myocardial tissue, which, in turn, may precipitate cardiac arrest in the absence of active ischemia. The mechanical behavior of left ventricular wall segments with different degrees of scar tissue located at different distances from the interface between infarcted and noninfarcted myocardial tissue can help predict inducibility of monomorphic ventricular tachycardia (VT) in patients with ischemic cardiomyopathy. Thus, enhanced border zone mechanical function is a potential marker to VT inducibility in patients with prior myocardial infarction (MI) and left ventricular dysfunction.

Until recently, tagged-MRI was the only modality that provided assessment of myocardial mechanical function. Tagged MRI is, however, not the modality of choice for assessing myocardial mechanical function due to poor resolution. Echo based 2D and 3D speckle tracking allow higher spatial and temporal resolutions at significantly lower costs. Furthermore, once a pacemaker has been implanted further MRI studies (e.g. for following up and future adjustments) are precluded. Ideally, combined visual information would add incremental and significant information about myocardial function.

To date, the tools used for cardiac imaging and diagnostics are limited to post-processing workstations, cardiovascular workstations with one specific modality (such as ultrasound, for example), or CV PACS system, which provides the means to store, access, view, interact and report on the results of CV imaging procedures. Typically, the PACS systems has 'multi-modality' capability but limited 'post-processing' functionality.

The existing tools today do not provide segmentation solutions for "long-axis" MRI images (only for "short-axis" (closed forms) but with limited accuracy). None of the existing tools provide for automatic processing of left ventricular segmentation, and automatic calculations of clinical indices (LV volume, stroke volume, etc.). None of the existing tools provide for data for longitudinal deformation in MRI "long-axis" images, and thus no ability to calculate strains. Moreover, none of the existing tools allow for fusion of LE-MRI with c-MRI or for fusion of echocardiography and c-MRI or other imaging modalities with one another.

Moreover, while cardiac magnetic resonance (CMR) imaging has emerged as an established technique providing accurate information on myocardial function and myocardial scar, and late gadolinium enhancement (LGE) CMR is used for evaluating perfusion pathologies and for distinguishing between reversible and irreversible myocardial ischemic injury, myocardial deformation imaging allows for objective assessment of myocardial function. The currently applied reference method for analysis of myocardial deformation in CMR is tagged MRI (TMRI). Myocardial tagging refers to a family of techniques that lay out a saturation grid or series of saturation lines across the heart. Deformations of these lines due to myocardial contraction are then monitored and provide an in-plane motion component (2D motion).

Tagging can be used to measure myocardial strain, but quantitative analysis of tagged images is not straightforward. Some disadvantages of tagging are that it requires a specific and unique acquisition protocol, it usually suffers from progressive deterioration of the tag signal during the cardiac cycle, and it requires long breath-hold acquisition and time-consuming post-processing.

Thus, for a routine comprehensive evaluation of myocardial function and viability, other methods are needed.

Others MRI techniques for analysis of regional ventricular function include phase contrast MR imaging (PCMRI), displacement encoding with simulated echoes (DENSE), and strain encoding (SENC) MR. One drawback common to all of these approaches, among others, is that they require acquisition of a specialized image dataset at the time of the examination, typically in addition to the standard cine CMR of the ventricles. Thus, they require a priori planning, increase the duration of the examination, and cannot be applied retrospectively to existing CMR datasets.

There is thus a need for a tool for enhanced measurement of myocardial mechanical function.

SUMMARY OF THE INVENTION

There is provided, in accordance with embodiments of the present invention, a method for evaluation of cardiac function. The method includes providing a first image sequence of the heart, providing a second image sequence of the heart, wherein the second image sequence is of a different imaging modality than the first image sequence, automatically segmenting the first image sequence, processing the second image sequence to match a gray-scale of the first image sequence, fusing the segmented first image sequence and the processed second image sequence into a fused image sequence; and evaluating cardiac function based on the fused image.

In accordance with additional features of the present invention, the imaging modality of the first and second image sequence may be cine MRI, ultrasound, cardiac CT, LE-MRI, or tagged MRI or others, and are different from one another. In accordance with additional embodiments, a third image sequence is provided, having a different imaging modality than the first and second image sequences, wherein the data fusor is configured to fuse data from the third image sequence with the first and/or second image sequences.

In accordance with additional features of the present invention, the automatic segmentation includes marking boundaries of a cardiac muscle taken from a single frame of the first image sequence, and propagating the marked boundaries through additional frames of the first image sequence. In accordance with yet additional features of the present invention, the fused image sequence may undergo post-processing to further extract myocardial mechanical data such as mid-myocardial longitudinal strain. In some embodiments, a treatment may be provided based on the evaluation of cardiac function. In yet additional embodiments, following treatment an image sequence may be provided from one of the modalities for further evaluation of cardiac function and effectiveness of the given treatment.

There is provided, in accordance with additional embodiments of the present invention, a method for segmentation of cardiac images in long-axis view. The method includes providing an image sequence in the long-axis view, selecting a first image frame from the provided image sequence, marking at least two points on the selected first image frame, segmenting the first image frame based on the marked points, and registering the segmented image between successive frames of the provided image sequence to provide the segmented cardiac image in long-axis view.

In accordance with further features of the present invention, the first image frame may be the first frame in the image sequence, or may be a different frame in the sequence. Selection of the first frame may be done automatically or manually. Marking at least two points may be done automatically or manually. In some embodiments, the marking of at least two points includes marking a mitral valve left hinge point and a mitral valve right hinge point at an end-diastolic image. In some embodiments, the segmenting includes finding a minimal path through a weighted map that represents endocardial and epicardial edges in the selected first image frame. In some embodiments, registering includes non-rigid registration. The segmented image may further be processed, either by fusion with an imaging sequence from a different image modality or by calculation of mechanical properties such as mid-myocardial strain or both fusion and calculation of mechanical properties. In some embodiments, the provided image sequence is provided as rotating slices.

In accordance with further features of the present invention, the registration may include warping each frame of the provided image sequence, determining location of points in the frame based on the warping, modeling global motion of the located points, modeling local motion of the located points, computing a transformation field for each frame, and computing displacement of endocardial points between subsequent frames based on the transformation field.

In accordance with further features of the present invention, calculating mid-myocardial strain may include tracking deformation information obtained from the registration, using a two-dimensional deformation map for each frame, and calculating mid-myocardial strain from displacement of centroid points of corresponding points located on endocardial and epicardial boundaries.

In accordance with further features of the present invention, the method may further include providing a second image sequence having an imaging modality which is different than the provided first image sequence, transforming the second image sequence into a gray scale that is compatible with a gray scale of the first image sequence, and fusing the first image sequence and the second image sequence.

There is provided, in accordance with embodiments of the present invention, a system for evaluation of cardiac function. The system includes a first modality imaging system configured to provide a first image sequence of the heart, a second modality imaging system configured to provide a second image sequence of the heart, wherein the second image sequence has a different image modality than the first image sequence, a processor for processing and fusing the first and second image sequences and a display for displaying the fused images. The processor includes a first modality sub-processor for processing the first image sequence and configured to segment the first image sequence, a second modality sub-processor for processing the second image sequence, and a data fusor for fusing the processed first image sequence and the processed second image sequence and providing fused imaging data to the display.

Unless otherwise defined, all technical and scientific terms used herein have the same meaning as commonly understood by one of ordinary skill in the art to which this invention belongs. Although methods and materials similar or equivalent to those described herein can be used in the practice or testing of the embodiments of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of various embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several embodiments of the invention may be embodied in practice.

In the drawings.

Figure 1:
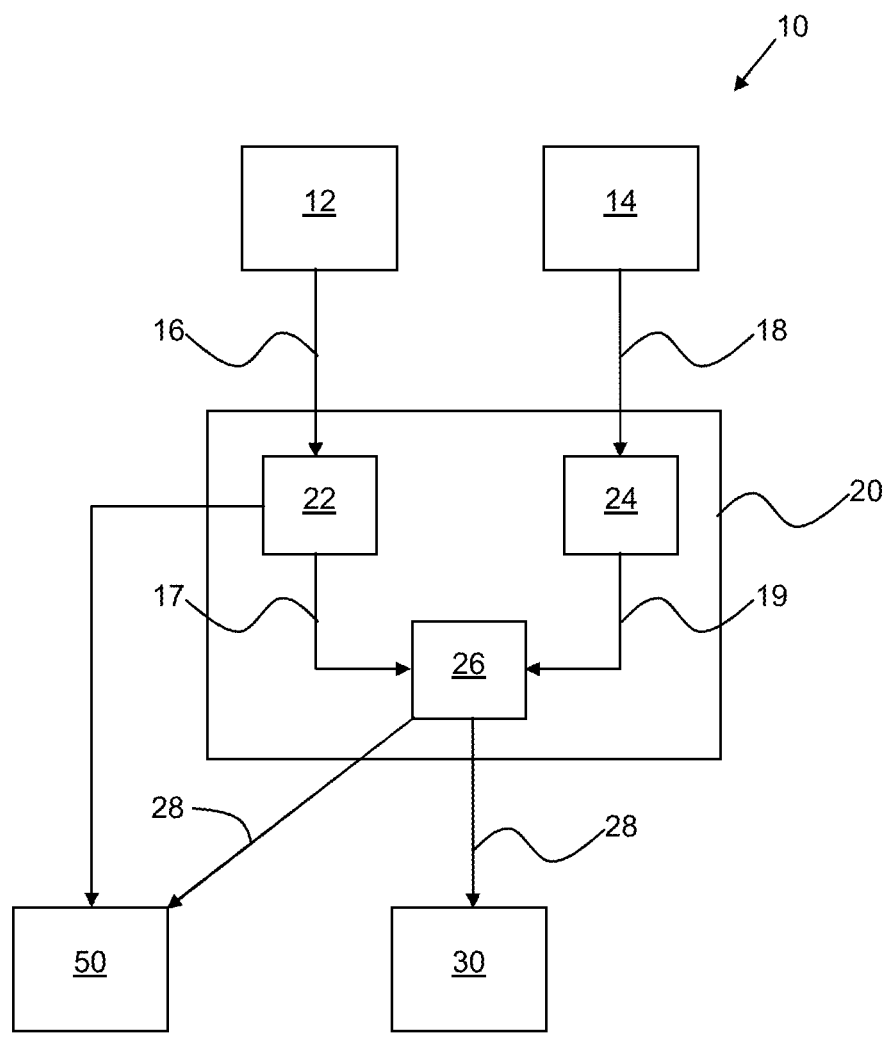
FIG. 1 is a block diagram illustration of a system for measurement of myocardial function, in accordance with embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the present invention. It will be understood by those of ordinary skill in the art that embodiments of the present invention may be practiced without these specific details. In other instances, well-known methods, procedures, components and structures may not have been described in detail so as not to obscure the present invention.

The present invention relates to a system and method for enhanced measurement of myocardial function. More specifically, the present invention relates to a system and method for providing automatic segmentation using an imaging modality such as cine MRI, which can lead to fusion of this imaging modality with other imaging modalities, and which can also provide for enhanced post-processing myocardial function evaluation.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

Reference is now made to FIG. 1, which is a block diagram illustration of a system 10 in accordance with embodiments of the present invention. System 10 includes a first modality imaging system 12 and a second modality imaging system 14. First modality imaging system 12 is configured to provide first modality imaging data 16 to a processor 20, and second modality imaging system 14 is configured to provide second modality imaging data 18 to processor 20. Processor 20 includes a first modality sub-processor 22 for processing of first modality imaging data 16 to provide processed first modality imaging data 17, and a second modality sub-processor 24 for processing of second modality imaging data 18 to provide processed second modality imaging data 19. Processor 20 further includes a data fusor 26 for fusing said processed first and second modality imaging data 17, 19 to provide fused imaging data 28. System 10 further includes a display monitor 30, which is configured to receive and display fused imaging data 28 from processor 20.

In some embodiments, first modality imaging system 12 is a cardiac magnetic resonance imaging (cMRI) system, for example, a Sonata, Siemens (Erlangen, Germany), and first modality imaging data 16 are cine MRI images or clips. Among the existing medical imaging modalities, cMRI has attracted significant interest in the research and clinical communities, as it is capable of acquiring many cardiac physiological measures including cardiac structure, function, perfusion and myocardial viability. The fact that it does not use ionizing radiation plays an ever-increasing role, particularly when pediatric or young patients are involved. In other embodiments, first modality imaging system 12 is a cardiac CT system, and first modality imaging data 16 are CT scans. In yet additional embodiments, first modality imaging system 12 is an ultrasound imaging system (echocardiogram) for example, Vivid 7 General Electric Healthcare Inc., (Haifa, Israel), and first modality imaging data 16 are echocardiogram images. Such images may be obtained during clinical examination and acquired in standard clinical acquisition planes. In yet additional embodiments, first modality imaging system is a cMRI system and first modality imaging data are tagged MRI slices. In yet additional embodiments, first modality imaging system is a cMRI system and first modality imaging data are LE-MRI slices. The invention is not limited to the examples included herein and may include other cardiac imaging modalities as well.

Second modality imaging system 14 is also a cardiac imaging system, and may be, for example, a cMRI, an ultrasound imaging system (echocardiogram), a cardiac CT system or other imaging system, and second modality imaging data 18 are data that are output by second modality imaging system 14 and are different than first modality imaging data 16. For example, first modality imaging data 16 may be cine MRI images or clips, and second modality imaging data 18 may be echocardiogram images or clips. Alternatively, first modality imaging data 16 may be cine MRI images or clips and second modality imaging data 18 may be LE-MRI images or clips. Any combination wherein first modality imaging data 16 is of a different type than second modality imaging data 18 is possible and is included within the scope of the invention.

In yet additional embodiments, a third modality imaging system may be provided as well, wherein third modality imaging data are also sent to processor 20, separately segmented, and fused with first and second modality imaging data 16 and 18. In some embodiments, second modality imaging system is an ultrasound imaging system, and third modality imaging system is a cardiac MRI, providing LE-MRI data.

Figure 2:
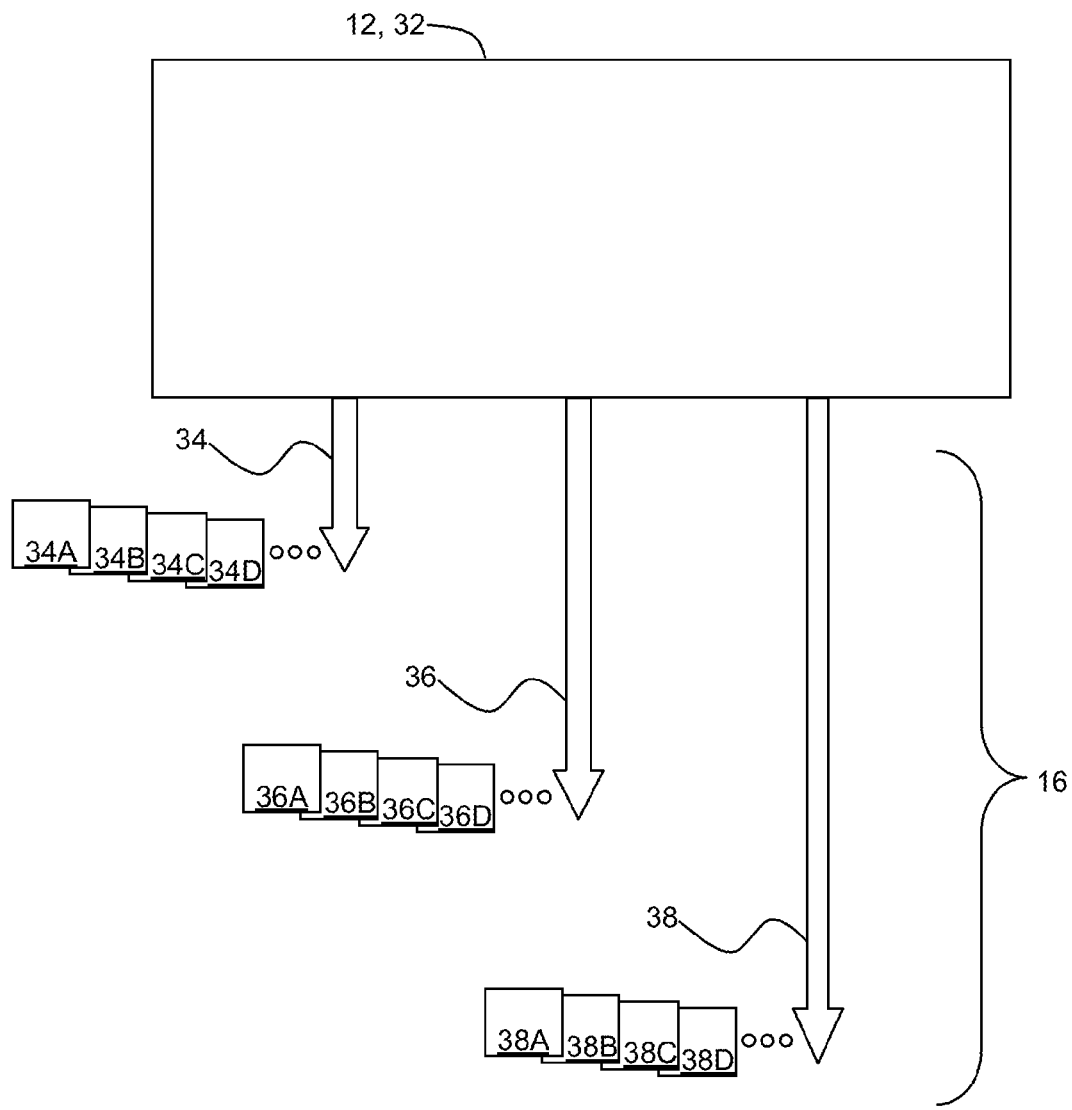
FIG. 2 is a block diagram illustration of a first modality imaging system of the system of FIG. 1, in accordance with embodiments of the present invention.

Reference is now made to FIG. 2, which is a block diagram illustration of first modality imaging system 12, in accordance with embodiments of the present invention. First modality imaging system 12 may be a cardiac MRI system 32, as shown in FIG. 2, or may be a cardiac CT, or other systems. In this embodiment, first modality imaging data 16 include multiple imaging sequences. In the present embodiment, multiple imaging sequences include a first imaging sequence 34 obtained for a first view, a second imaging sequence 36 obtained for a second view, and a third imaging sequence 38 obtained for a third view. It should be readily apparent that additional views may also be included and are within the scope of the present invention. As a non-limiting example, first imaging sequence 34 may be taken for an apical long-axis view, second imaging sequence 36 may be taken for a two-chamber (2CH) view, and third imaging sequence 38 may be taken for a four-chamber (4CH) view. For each view, the imaging sequence includes multiple slices, wherein each slice represents an image at a moment of time within the cardiac cycle. For example, in first imaging sequence 34, a first imaging sequence first frame 34a is followed sequentially by a first imaging sequence second frame 34b, a first imaging sequence third frame 34c, etc. Similarly, in second imaging sequence 36, a second imaging sequence first frame 36a is followed sequentially by a second imaging sequence second frame 36b, a second imaging sequence third frame 36c, etc. In some embodiments, fifty frames or more are obtained for each imaging sequence.

In order to process an imaging sequence obtained from first modality imaging system 12, the imaging sequence is first segmented. Manual delineation of all images may involve hundreds of contours per patient, thus analysis of these images is an extremely time-consuming and tedious task. Furthermore, manual segmentation is subjective and is prone to inter and intra-observer variability. Therefore, development of automatic systems to analyze these images and enable derivation of clinically useful information is highly desirable.

Many of the fully automatic methods fail to produce accurate myocardial contours near the papillary muscles and the trabeculae. The papillary muscles project from the ventricular walls into the LV cavity, are roughly conical in shape, and they anchor and pull the heart valves. The trabeculae comprise bands of muscles lining the inside of the ventricles. The function of the trabeculae is to reduce the turbulence of blood during systole. These protrusions are possibly one of the reasons for variability among the various methods in the estimation of clinical parameters based on cMRI, due to inclusion or exclusion of the trabeculae and/or the papillary muscles of the LV.

Following clinical convention, the papillary muscles and trabeculae are required to be surrounded by the myocardial contour to allow for accurate measurement of the physiological parameters. This requirement complicates the segmentation, since no local image feature can be used to distinguish the papillary muscles and trabeculae from the myocardium.

Figure 3:
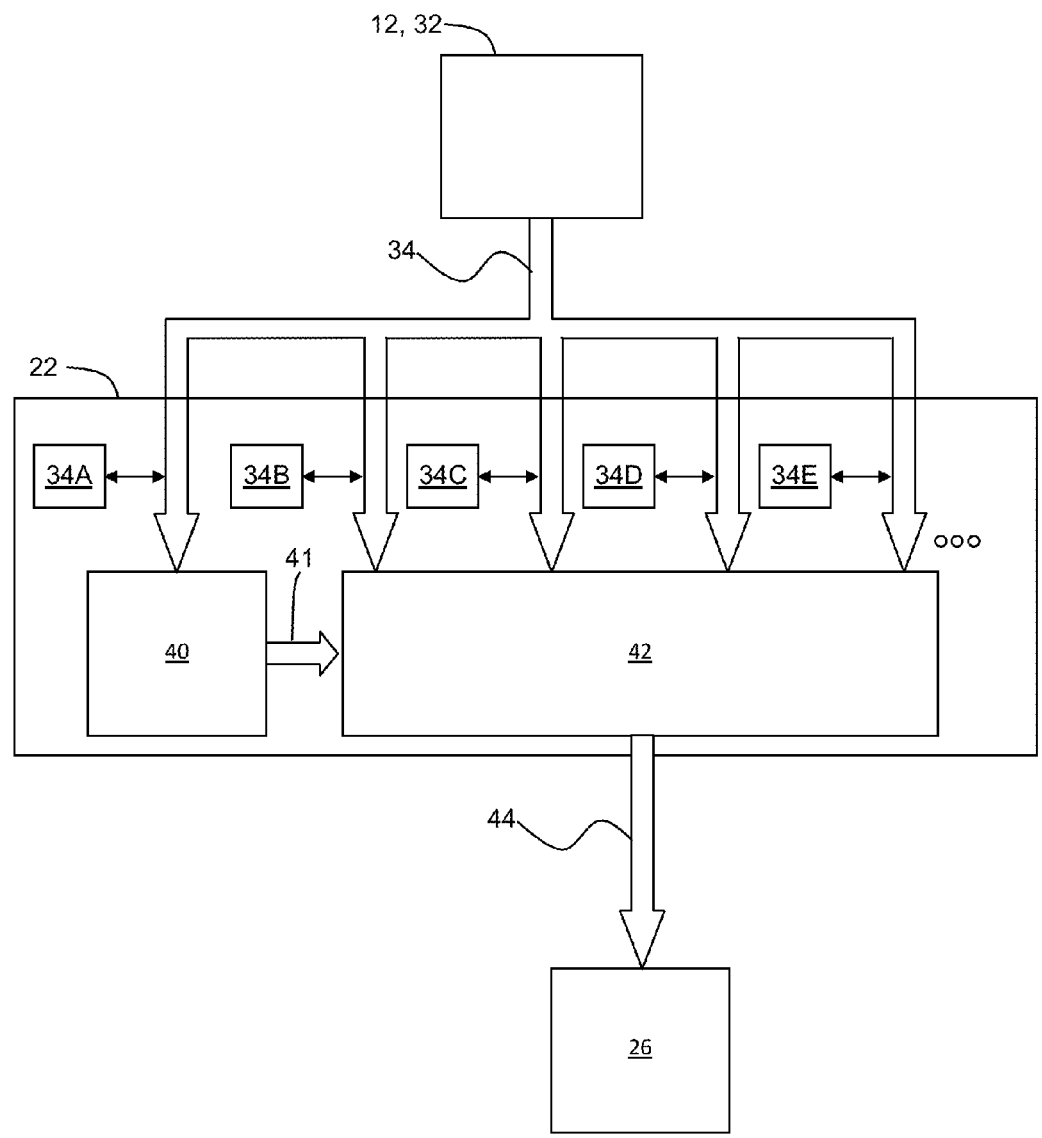
FIG. 3 is a block diagram illustration of a sub-processor of the system of FIG. 1, wherein the sub-processor is configured for processing imaging data from the first modality imaging system of FIG. 2.

In the present invention, segmentation is done automatically via first imaging modality sub-processor 22. Reference is now made to FIG. 3, which is a block diagram illustration of first imaging modality sub-processor 22 of FIG. 1, in accordance with embodiments of the present invention. First imaging modality sub-processor 22 is configured to receive an imaging sequence. In the example shown herein, first imaging sequence 34 is depicted as an exemplary embodiment. However, it should be readily apparent that any of the imaging sequences may be segmented in accordance with the description herein. First imaging sequence 34 is prepared within first modality sub-processor 22 for fusion with imaging data from second modality imaging system 14. In order to prepare imaging sequence 34 for fusion with data from second modality imaging system 14, it is necessary to extract fiducial points in first imaging sequence 34. Fiducial points may include, for example, the boundaries of the cardiac muscle. In order to do this, first imaging sequence 34 must first be segmented (i.e. separated into two main segments: the cardiac muscle and the rest of the object within this slice, i.e, the intra-ventricular blood pool and the pericardium). Sub-processor 22, in accordance with embodiments of the present invention, is configured to process the imaging data using a segmentation method, which allows calculation of the myocardial velocity fields in both space and time along the myocardial borders, and thus also their estimation within the walls.

First modality sub-processor 22 includes a static image marker 40 and a dynamic image marker 42. As described above, first imaging sequence 34 includes a first imaging sequence first frame 34a followed sequentially by a first imaging sequence second frame 34b, a first imaging sequence third frame 34c, etc. Static image marker 40 is configured to receive a single frame for analysis. In embodiments of the present invention, the single frame may be first imaging sequence first frame 34a, but it should be readily apparent that a different image frame may be used instead if it is more suitable for the analysis to be performed. Static image marker 40 performs segmentation on first imaging sequence first frame 34a to provide segmented static data 41, as will be described in greater detail herein below. The segmented static data 41 is received by dynamic image marker 42. Dynamic image marker 42 also receives first imaging sequence second frame 34b, first imaging sequence third frame 34c, and all of the additional first imaging sequence frames provided by first modality imaging system 12. Dynamic image marker 42 propagates segmented static data 41 throughout the entire first imaging sequence 34. More specifically, contour points from the segmentation of first imaging sequence first frame 34a are noted by dynamic image marker 42, and then propagated through first imaging sequence second, third, etc. frames to provide segmented first modality image data 44. This segmented first modality image data 44 is sent to data fusor 26 for further processing and fusion with second modality image data, also received separately by data fusor 26. Alternatively, segmented first modality image data 44 is sent to a post-processing functional evaluator, as will be described in further detail hereinbelow.

In embodiments of the present invention, segmentation of the single frame is done via shortest path technique and propagation of the contour points found during segmentation is done using non-rigid temporal registration. It should be readily apparent, however, that other techniques are possible as well, for example, using methods based on deformable contour (a.k.a Active Contour) or other methods which are known to those of ordinary skill in the art.

An algorithm for segmentation for long-axis views (e.g. 4CH and 2CH views), such as one performed by first modality sub-processor 22 as described above with reference to FIG. 3, must comply with several requirements; first, it should be able to process, and overcome the problem of small structures, e.g., the papillary muscles and the trabeculae. Second, it should detect both the endocardium and epicardium throughout the entire cardiac cycle (i.e. all frames of the cMRI cine loop). Third, the proposed algorithm should be automatic or independent of user input, in order to reduce processing time and provide reproducibility and lower inter and intra-observer variability.

Figure 4:
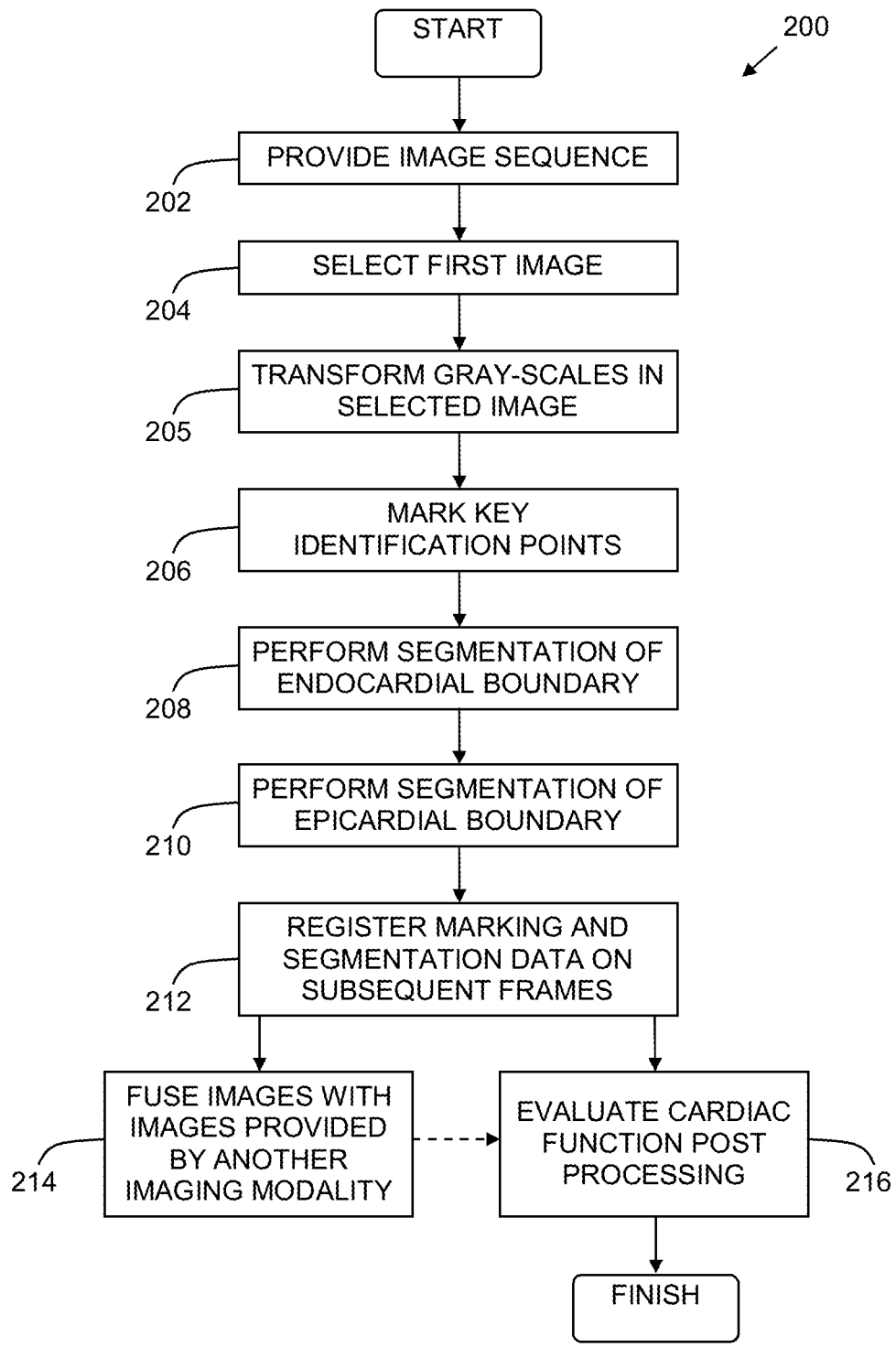
FIG. 4 is a flow-chart diagram illustration of a method for segmentation of images in a long-axis view using the first modality imaging system of FIG. 2 and the sub-processor of FIG. 3, in embodiments of the present invention.

Reference is now made to FIG. 4, which is a flow chart illustration depicting a method 200 for segmentation of images in long-axis views, in accordance with embodiments of the present invention. First, an imaging system provides (step 202) an image sequence in a selected view. In embodiments of the present invention, imaging system is a cardiac MRI. In other embodiments, imaging system is an echocardiogram or cardiac CT. Next, a first image is selected (step 204) from the provided image sequence for static segmentation. In some embodiments, the first image is the first frame in the provided image sequence. In other embodiments, the first image is a different frame, selected based on suitability of identification of major points. In one embodiment, the step of selecting (step 204) is done automatically within first imaging modality sub-processor 22. Automatic selection may be based on sequence (ie, the first frame of the image sequence is always selected), or may be based on selection criteria pre-programmed into first imaging modality sub-processor 22. In another embodiment, the step of selecting (step 204) the first image is done manually by a user after identification or viewing of the image frames in the image sequence. Once the first image is selected, if the final, segmented image is to be fused with images from a second modality imaging system, gray-scales in the selected image are transformed (step 205) to values that are similar to gray-scale values of the second modality images. Next, key identification points are marked (step 206) on the image. In some embodiments, the step of marking (step 206) is done automatically within first imaging modality sub-processor 22 based on marking criteria pre-programmed into first imaging modality sub-processor 22. In another embodiment, the step of marking (step 206) the first image is done manually by a user. In embodiments of the present invention, the marked points include the Mitral Valve's left and right hinge points corners (MVHPs) at the end-diastolic (ED) image. The ED phase is used because the myocardial muscle is relaxed, and the papillary muscles and trabeculae are more distinctive. However, it should be readily apparent that other areas in the image or other phases during the cycle may be used and are included in the scope of the invention. Next, the endocardial boundary on the first image is segmented (step 208) automatically via static image processor 40 of first imaging modality sub-processor 22. In embodiments of the present invention, this segmentation is done based on finding a minimal path through a weighted map that represents the edges in the image. Next, the epicardial boundary is segmented (step 210) automatically via static image processor 40 of first imaging modality sub-processor 22. In some embodiments, steps 208 and 210 may be reversed. In embodiments of the present invention, this segmentation is also done based on finding a minimal path through a weighted map that represents the edges in the image. All of the static information, that is, marking and segmentation of the left ventricle heart muscle on the selected single image frame, is sent to dynamic image processor 42 of first imaging modality sub-processor 22, and this information is registered (step 212) between successive frames of the provided image sequence in order to track the segmenting curve over the entire cine. In embodiments of the present invention, registration is a non-rigid registration, as will be described in greater detail hereinbelow. Once segmentation of images is done, the images can be fused (step 214) with images from other modalities, as described with reference to FIG. 1. In some embodiments, images can be evaluated (step 216) for cardiac function post-processing, either with or without fusion with images from other imaging modalities. Post-processing may include, for example, calculation of mechanical properties such as myocardial strain, or other mechanical properties such as myocardial longitudinal strain rate, velocity and displacement, or global functions such as left ventricle volume, ejection fraction, left ventricle myocardial mass, or others.

Registration (step 212): It should be readily apparent that tracking myocardial boundaries is not a trivial task due to several reasons. First, the motion of the myocardium is very complex and to a certain degree unpredictable, especially in cases where abnormal and paradoxical motions occur (eg, in myocardial ischemia). Second, because most of the pixels on the boundaries are not unique features, the "aperture problem" for locally straight boundaries might be a major difficulty for pixel based tracking techniques. Therefore, these methods are not suitable for tracking the myocardial boundaries.

A recursive coarse-to-fine strategy is used in the registration step, which provides the ability to handle large motion between successive frames. This kind of motion could be a result of several factors: low frame rate acquisition, high heart rate during cardiac stress test, cardiac arrhythmias and relatively high motion at diastole. Furthermore, this strategy provides a sub-pixel resolution in the finest level of the pyramidal implementation (the original image level), which has been demonstrated to provide good accuracy.

Figure 5:
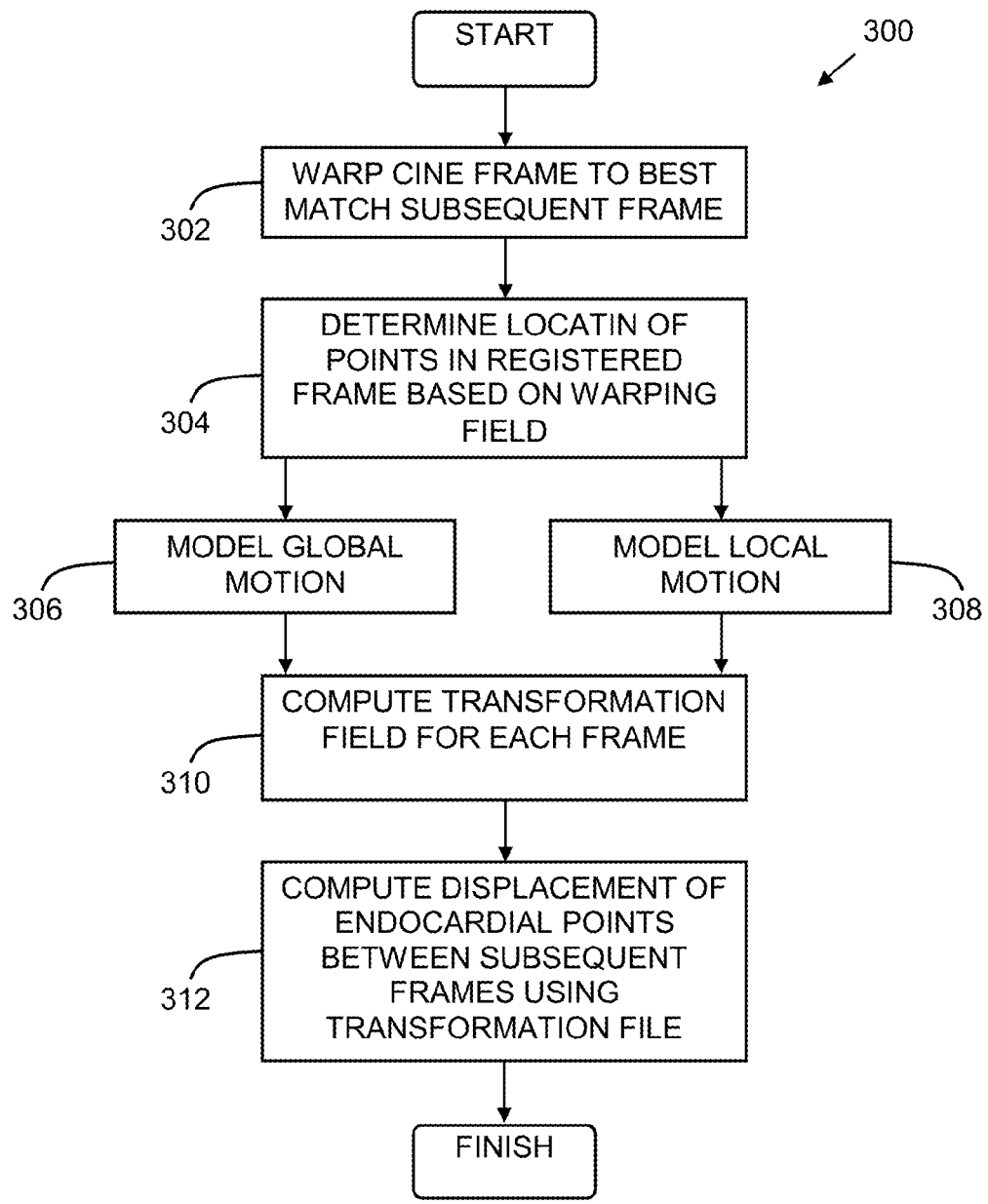
FIG. 5 is a flow-chart diagram illustration of a method of registration of frames from step 212 of the method of FIG. 4 described in greater detail, in accordance with embodiments of the present invention.

Reference is now made to FIG. 5, which is a flow-chart diagram of a method 300 of registration, in accordance with embodiments of the present invention. First, each frame of the cine is warped (step 302) to best match its subsequent frame. This warping field is then used to determine (step 304) the location of points in the registered frame. Since the object to be registered is assumed to be elastic, a non-rigid registration technique is used, wherein a hierarchical transformation model captures the global and local motion of the object. The global motion is modeled (step 306) using one system such as, for example, affine transformation, and the local motion is modeled (step 308) using a different system such as, for example, free form deformation (FFD) model. A transformation field is computed (step 310) for each frame, and the displacement of endocardial and epicardial boundaries points between subsequent frames is computed (step 312) through the transformation function. Details of an example of method 300 can be found in Example 1 hereinbelow.

In some embodiments, a similar type of registration can be done on subsequent rotating slices. In this case, the first stage of segmenting the endocardium and epicardium is not required. This registration between subsequent rotating slices will work if there are no anatomical differences between the slices (eg, the LV blood pool and myocardium are both visible on both slices). For rotating slices or for subsequent non-rotating slices, if structural differences are present, the algorithm may not work properly. This can be corrected for by checking for existence of important structures, and skipping frames in which these structures are not visible.

Figure 6:
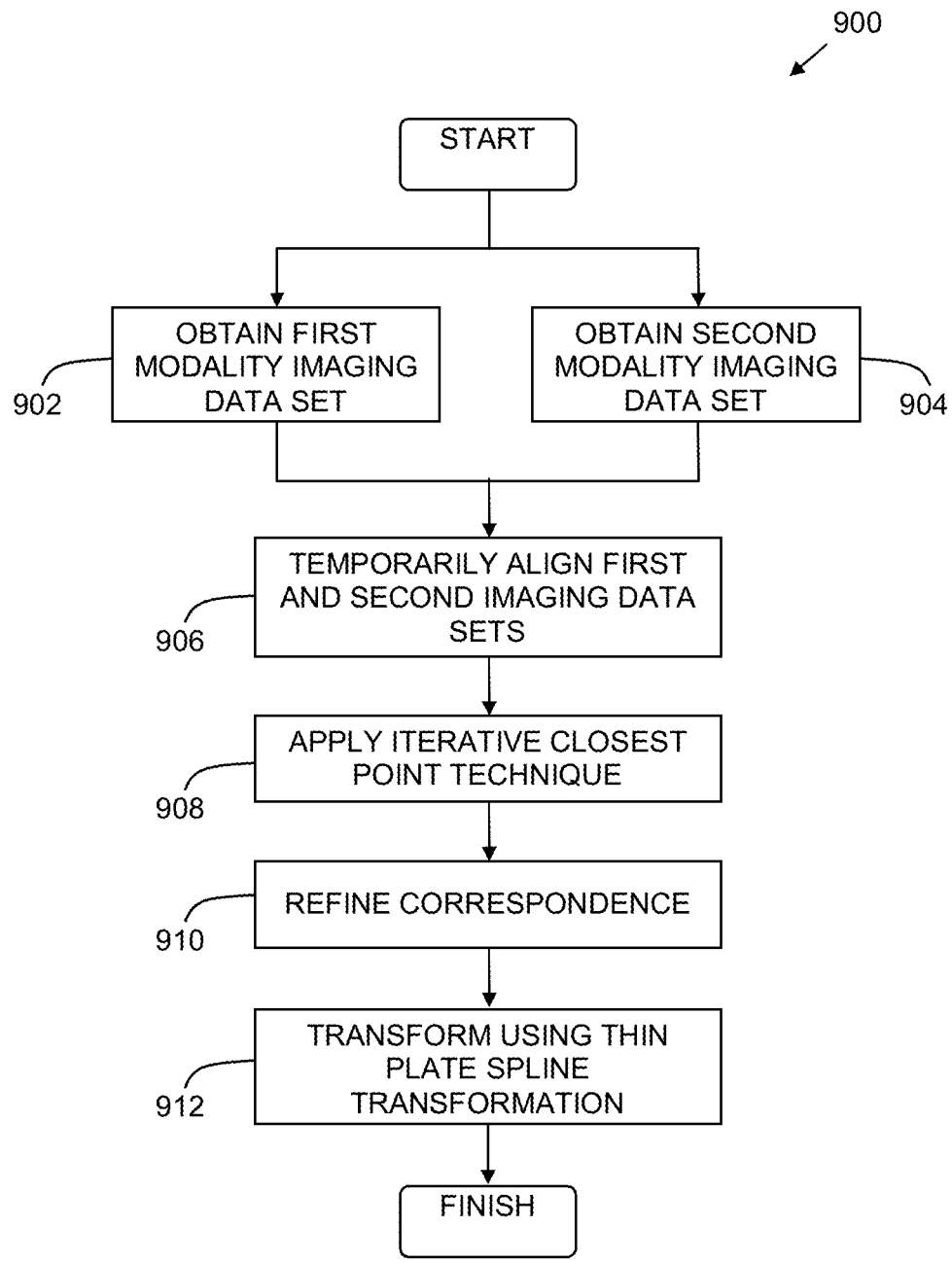
FIG. 6 is a flow-chart diagram illustration of a method of fusing images of different modalities, in accordance with embodiments of the present invention.

Reference is now made to FIG. 6, which is a flow-chart illustration of a method 900 of fusing data from two imaging modalities in accordance with an embodiment of the present invention. It should be readily apparent that the method shown in FIG. 6 is exemplary, and other methods for fusing data are possible as well and are included within the scope of the invention. First, first imaging data are obtained (step 902) from first imaging modality system, and second imaging data are obtained (step 904) from second imaging modality system and sent to data fusor. Data fusor temporarily aligns (step 906) the first and second imaging datasets, and then applies (step 908) iterative closest point (ICP) technique, which is known to one of ordinary skill in the art. Next, data fusor refines (step 910) the correspondence between first and second imaging data, for example, using Generalized Multidimensional Scaling (GMDS) technique. and finally, transforms (step 912) the data using thin plate spline transformation.

Referring again to FIG. 1, data processed by first-modality sub-processor 22 may also be sent to a post-processing functional evaluator 50. Post-processing functional evaluator 50 may be used to compute myocardial strain or other mechanical properties such as myocardial longitudinal strain rate, velocity and displacement, or global functions such as left ventricle volume, ejection fraction, left ventricle myocardial mass, or others. Assessment of regional cardiac function is an important objective of the diagnosis and prognosis in the case of coronary artery disease. Both ischemia and infarction can be detected and localized through analysis of the regional patterns of motion within the heart, and more specifically, through myocardial strain analysis.

Several techniques have been proposed for myocardial strain analysis from standard cine CMR. However, these methods were designed for short-axis views, which yield only the circumferential or radial strain analysis, and do not provide longitudinal strain data.

In accordance with embodiments of the present invention, a method for longitudinal strain analysis in the mid-myocardial layer, based on cine CMR sequences is disclosed. Referring again to FIGS. 1 and 4, following non-rigid registration of subsequent frames, cardiac function may be evaluated (step 216) via post-processing functional evaluator 50. More specifically, non-rigid registration yields a deformation field for each frame. In embodiments of the present invention, post-processing functional evaluator 50 is a mid-myocardial longitudinal strain processor, which calculates mid-myocardial longitudinal strain according to the strain measurements in the endocardial and epicardial boundaries. In some embodiments, post-processing functional evaluator 50 is configured to process data from first-imaging sub-processor 22, and in other embodiments, post-processing functional evaluator 50 is configured to processed fused imaging data 28 from said data fusor 26.

The uniqueness of this method is that the CMR sequence does not need to be manipulated in any way in advance, as in other methods, and the datasets may be processed retrospectively by the proposed method.

Figure 7:
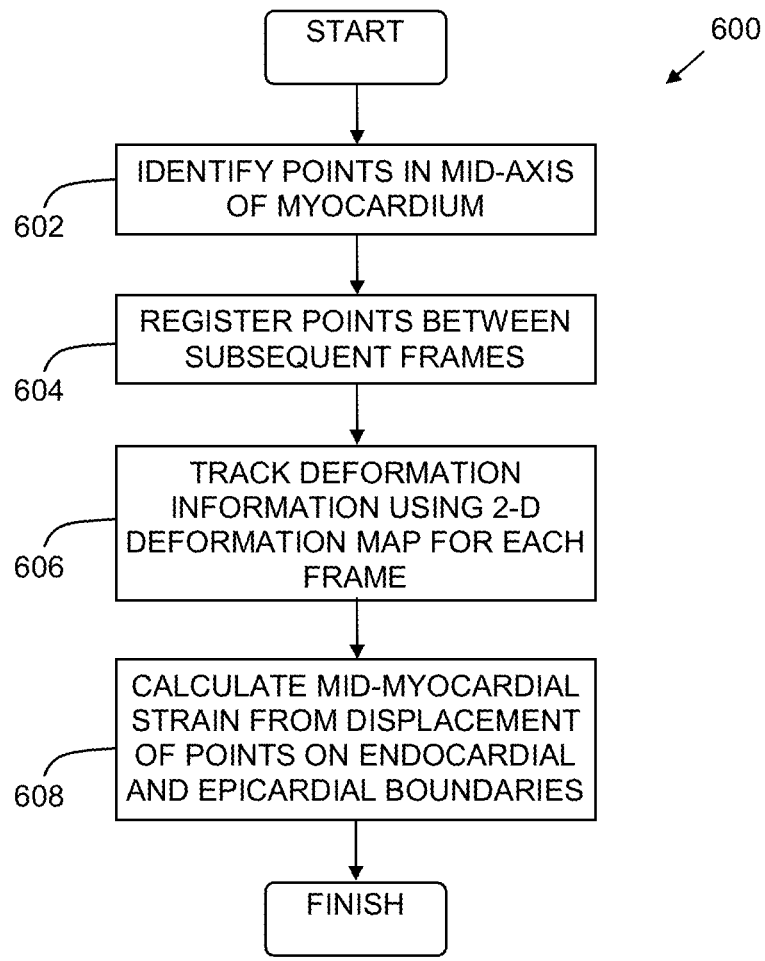
FIG. 7 is a flow-chart diagram illustration of a method of calculating mid-myocardial strain as a post-processing example of step 216 of the method of FIG. 4.

Reference is now made to FIG. 7, which is a flow-chart illustration of a method 600 of calculating mid-myocardial longitudinal strain in cardiac MRI images. Mid-myocardial longitudinal strain is calculated between points in the mid-axis of the myocardium. First, points in the mid-axis of the myocardium are identified (step 602). Next, the points are registered (step 604) between subsequent frames, which traces the deformation of the myocardium. Next, the deformation information is tracked (step 606) using a two-dimensional deformation map for each frame, until the last frame. This process tracks the motion of the myocardial boundaries in a way that is similar to the physiological motion of the myocardium. The mid-myocardial strain is then calculated (step 608) from displacement of centroid points of the corresponding points located on the endocardial and epicardial boundaries. An example of method 600 can be found in Example 2 hereinbelow.

Figure 8:
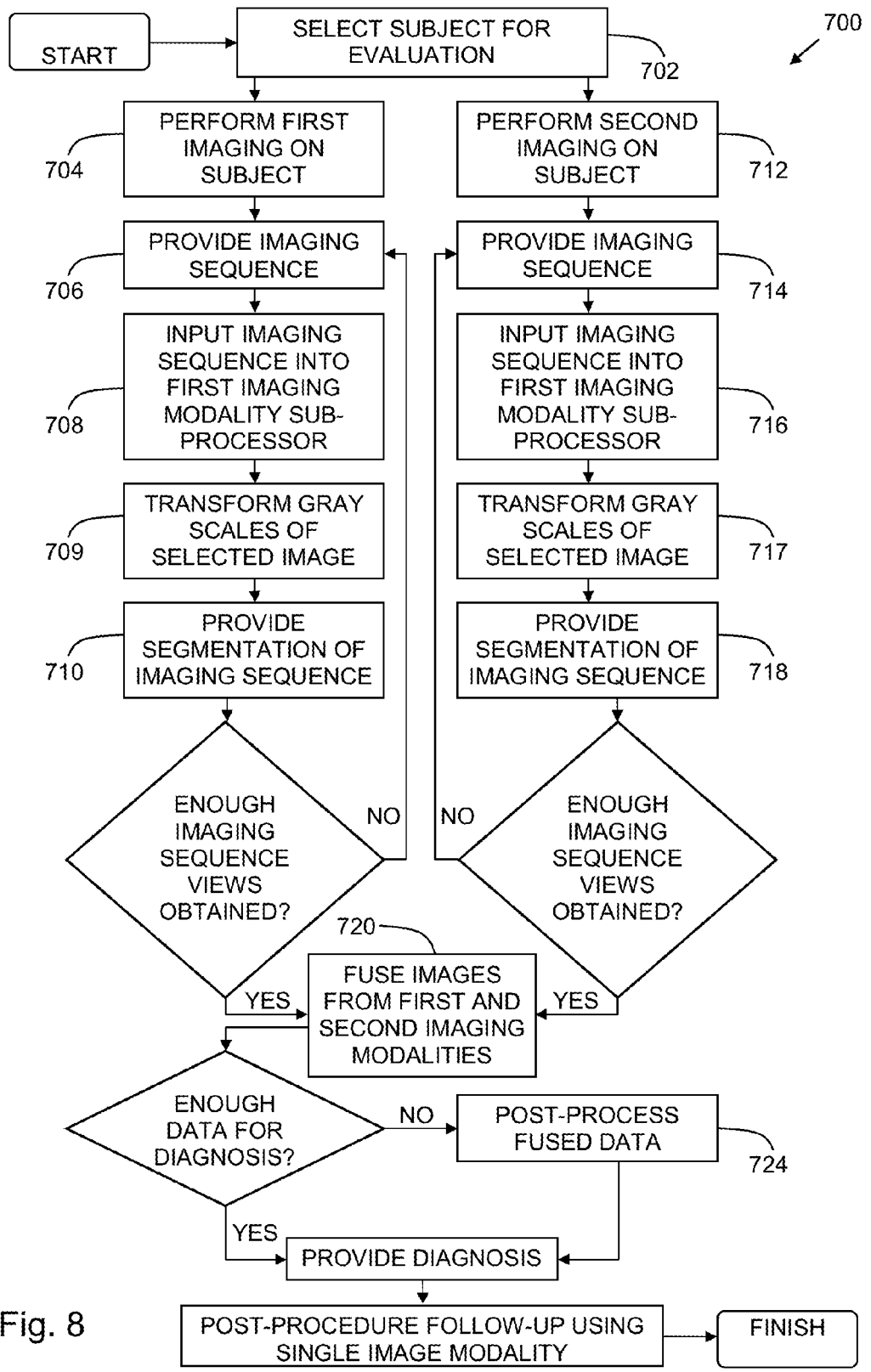
FIG. 8 is a flow-chart diagram illustration of a method of providing a diagnosis, in accordance with embodiments of the present invention.

Reference is now made to FIG. 8, which is a flow-chart illustration of a method 700 of providing a diagnosis based on enhanced measurement of myocardial mechanical function, in accordance with embodiments of the present invention. First, a user selects (step 702) a subject for diagnostic evaluation to determine whether the subject should receive a particular treatment. In one non-limiting example, the treatment is implantation of a cardiac defibrillator. In other embodiments, the treatment is cardiac catheterization, and in yet additional embodiments, the treatment is medication. These embodiments are exemplary, and any relevant treatment protocol is included within the scope of the invention. Next, a first imaging modality performs a first imaging (step 704) of the selected subject to provide a first imaging sequence (step 706). In embodiments of the present invention, first imaging modality is cMRI, and the imaging sequence provided is a sequence of cine MRI slices for a particular view. In other embodiments, first imaging modality is, for example, echocardiogram, LE-MRI, cardiac CT or others. The imaging sequence is input (step 708) into a first imaging modality sub-processor, either directly via the first imaging modality, or manually by the user. Next, the sub-processor performs gray-scale transformation (step 709) on the imaging sequence. Next, the sub-processor performs segmentation (step 710) on the imaging sequence. If more image sequences are desired, the steps of providing an image sequence (step 706), inputting the imaging sequence (step 708), performing gray-scale transformation, and performing segmentation (step 710) are repeated for additional imaging sequences. For example, multiple views may be desired. A second imaging is then performed (step 712) on the subject using a second imaging modality. In this imaging modality, which may be, for example, cMRI, echocardiogram, LE-MRI, cardiac CT or others, and is different than first imaging modality, an imaging sequence is provided (step 714). The second imaging sequence is input (step 716) into a second imaging modality sub-processor, which performs gray-scale transformation (step 717) on the imaging sequence. Next, the sub-processor performs segmentation (step 718) on the imaging sequence. If more image sequences are desired, the steps of providing an image sequence (step 714), inputting the imaging sequence (step 716), performing gray-scale transformation (step 717) and performing segmentation (step 718) are repeated for additional imaging sequences. For example, multiple views may be desired. The segmented images from the first imaging modality and the second imaging modality are then fused (step 720) to provide a robust imaging sequence, showing cardiac function. If the fused images provide enough information, a diagnosis may be provided (step 722) on the basis of the fused images alone. In some circumstances, additional information may be desired, such as myocardial mechanical strain measurements, for example. In those cases, the fused data may be sent for post-processing (step 724) to calculate additional parameters. In some embodiments, this step may be done without fusing imaging data. Using the post-processed data, a diagnosis is provided (step 726). In some cases, diagnosis may be followed by a procedure, such as implantation of a cardiac pacemaker. If follow-up images are desired, this may be done using a single imaging modality (step 728). For example, if first imaging modality is cMRI and second imaging modality is echocardiogram, the images may be fused for diagnosis, and then follow-up can be done using only echocardiogram. This may be particularly beneficial if one of the imaging modalities cannot safely be performed following the procedure.

The systems and methods described above were validated, as will be described in further detail in the Examples hereinbelow.

EXAMPLES

Example 1: Automatic Segmentation of Cardiac MRI Cines for Long Axis Views

Validation of a method of segmentation of the endocardium and epicardium in 2CH and 4CH views was performed. The method was validated on a clinical dataset by comparing its results to manual segmentation performed by experienced observers, which serves a gold-standard.

Method: Cardiac MRI Datasets: Data were obtained at two orthogonal cross-sections per phase, 2CH and 4CH. Each data sequence was acquired as 2D+time apical cine slice using ECG gated cine cMRI. The data consisted of clinical exams of 126 patients with suspected cardiac disease. The datasets were obtained from two sources: 26 patients were obtained from the Oslo University Hospital, Rikshospitalet, Oslo, Norway and dataset of 100 patients were obtained from the cohort. These data were randomly selected from the Cardiac Atlas Project (CAP) database. All images were acquired using the steady state free precession protocol (SSFP) and 1.5 Tesla MRI scanners from different vendors. Detailed description of the acquisition parameters is listed in Table 1 below.

TABLE 1

| Parameter | |
|---|---|
| Num. of cines | 252 |
| Num. of images per cine | 16-40 |
| Slice Thickness (mm) | 6-10 |
| Echo Time (ms) | 0.97-2.20 |
| Flip Angle (degrees) | 45-84 |
| Pixel Spacing (mm) | 0.70-2.18 |
| Trigger Time (ms) | 0-71.28 |

The first database (26 patients) included also a manual delineation of the endocardial and epicardial boundaries by two experienced observers. These boundaries were traced independently by two experts in a blind fashion. The resulting contours were averaged using a known approach. This procedure is based on establishing one-to-one correspondence between the points constituting the two curves. Then, the 'gold standard' curve passes through the middle (center of mass) of each corresponding pair. As a result, large disagreement between the two experts in one region will not affect the other regions. This method was also used to calculate the segmentation error, as will be described further hereinbelow.

For the second source of database (100 patients from CAP), the boundaries were defined by an expert-guided interactive customization of a finite element heart model, using the Cardiac Image Modeller (CIM) software (AMRG, Auckland, New Zealand). This boundary definition is based on a 4-D mathematical model, which was registered to a stack of SAX sequences. These sequences were manually segmented apriority. Next, an expert was required to refine the surface of the registered model using the interactive guide-point modeling technique (CIM software). Finally, the intersection of the registered model and the relevant long-axis images was determined to obtain the boundary traces for these datasets.

All these traces were obtained at ED and end-systolic (ES) phases, in 2CH and 4CH views, and were used as ground truth ('gold standard') construction. These frames were defined by an expert prior to the manual tracing by the experts, as defined above. These frames were also segmented by the proposed segmentation algorithm (as well as all other frames of the sequence). Thus, identification of the ED and ES times by the computer was unnecessary.

Segmentation of the Endocardium. The following steps describe the algorithm of the endocardial segmentation:

I. Image smoothing was performed using a bilateral filter (filter half-width=9 mm, standard deviation in coordinate space=9 mm, standard deviation in intensity space=0.05) to reduce noise while preserving the edges. Then, Canny edge detector was applied to this image (filter half-width=16 mm, Hysteresis high threshold was relative to the highest gradient magnitude within the image, low threshold was 40% of the high threshold, sigma was $\sqrt{2}$).

II. A basal middle point was defined between the left and right MVHPs, and then an approximated location of the apical point was defined at the intersection of the vertical line emerging from the basal middle point, and the nearest edge that the vertical line crossed.

Figure 9:
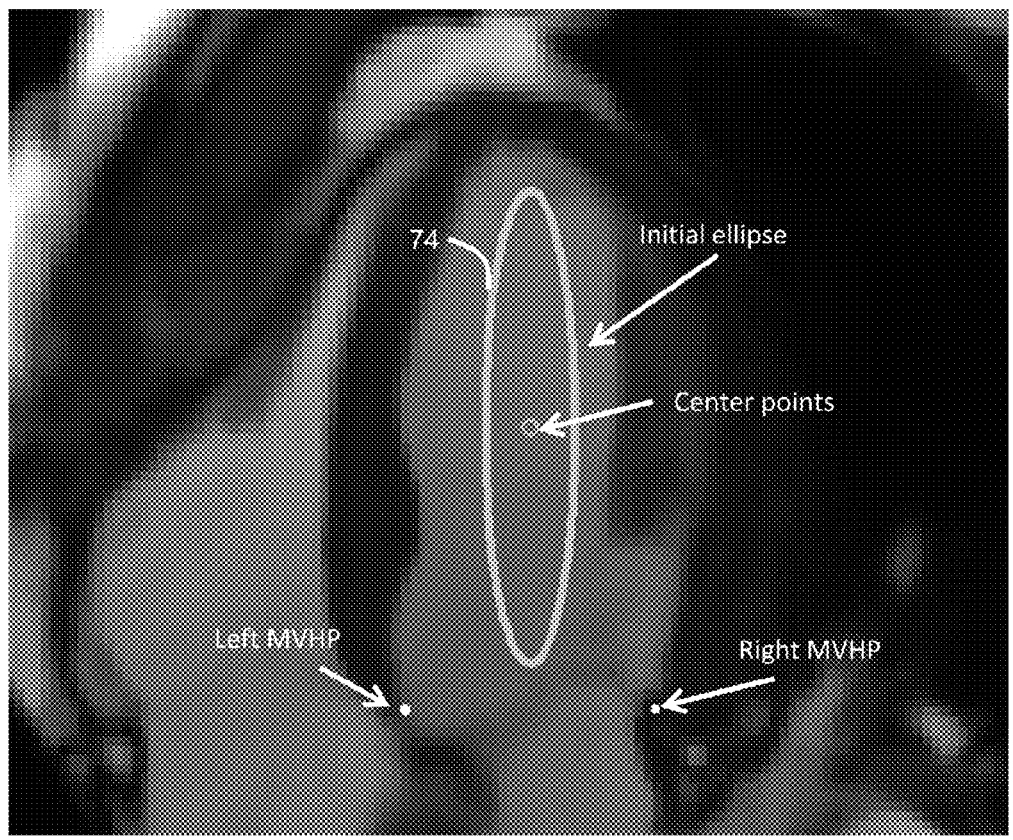
FIG. 9 is a photographic illustration depicting calculation of an ellipse at the center of the left ventricle of the heart in accordance with methods of the present invention.

III. Then, as shown in FIG. 9, an initial flattened ellipse 74 was defined at the center of the above vertical line.

Figure 10:
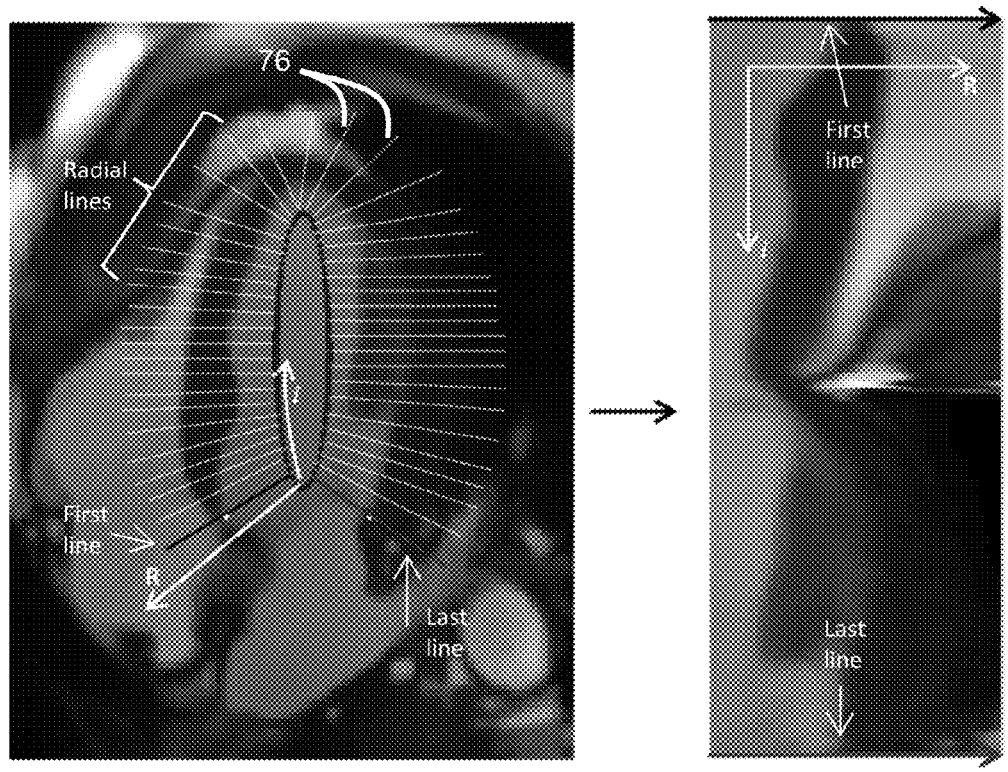
FIG. 10 is a photographic illustration depicting construction of radial lines from the ellipse of FIG. 9 to convert the image of FIG. 9 to a polar system, in accordance with methods of the present invention.

IV. As shown in FIG. 10, radial lines 76 were constructed, originating from the initial ellipse, toward the LV cavity edge—the Endocardium. These radial lines are perpendicular to the ellipse and have a fixed length of 25 mm. Radial lines which pass between the two MVHPs toward the left atrium were excluded. Gray level intensity was interpolated by Cubic spline interpolation along each radial line. Then, an image was constructed by stacking the lines, where each row of the image is a radial line.

V. For the first and last rows of this image (interpolated polar image) the peak intensity gradients were detected.

VI. Weighted map was built using Canny edge detector, which was applied to the above image. Weights were determined according to the gradient magnitude in the detected edges. Edges with positive horizontal gradient were weighted as zero.

VII. Fast Marching Method (FMM) was applied to the weighted map to obtain a distance map, and then "Runge-Kutta" scheme was used to trace the shortest path between the two gradient peaks, which were detected in step IV. Converting back the shortest path coordinates to image coordinates system was performed. This trace marks the endocardial boundary.

Figure 11:
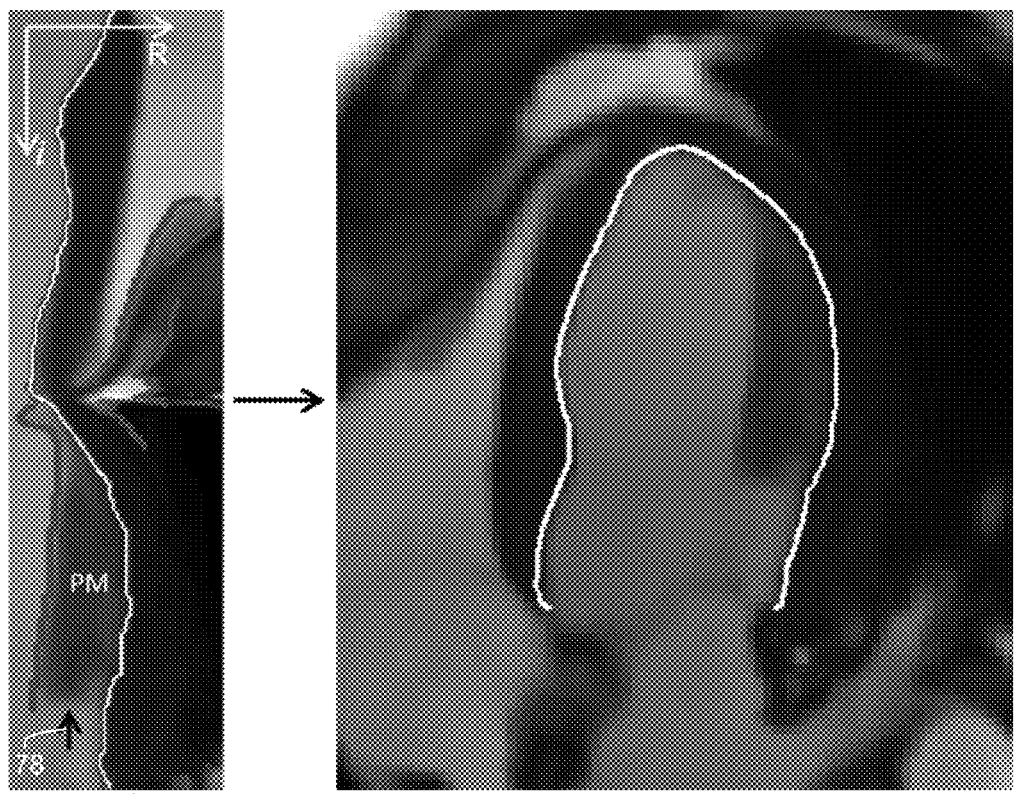
FIG. 11 is a photographic illustration of steps of a method of boundary detection, in accordance with methods of the present invention.
Figure 12A:
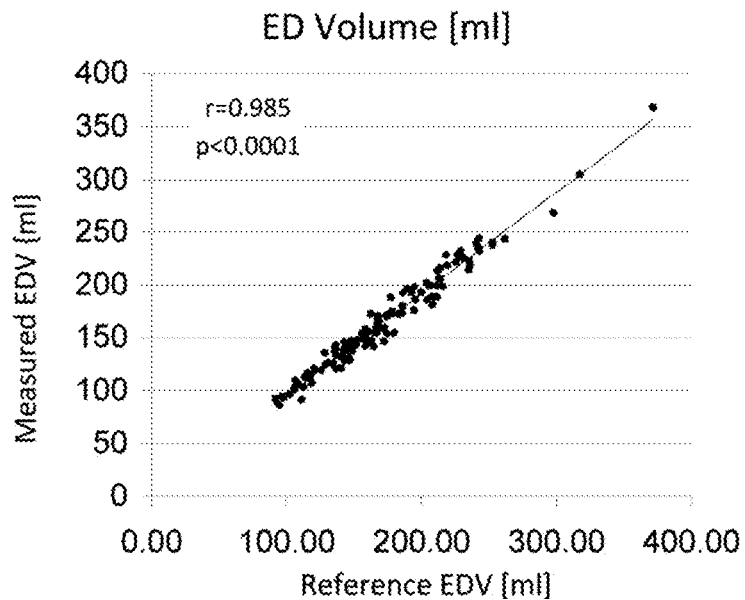
FIGS. 12A-12D are a series of graphical illustrations showing a comparison of measured clinical parameters against a gold standard, used for validation of methods of the present invention.
Figure 12B:
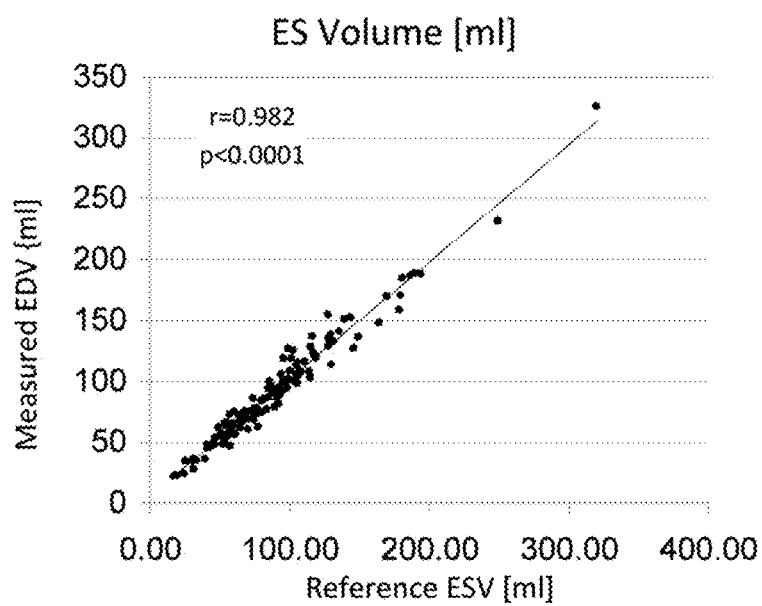
Figure 12C:
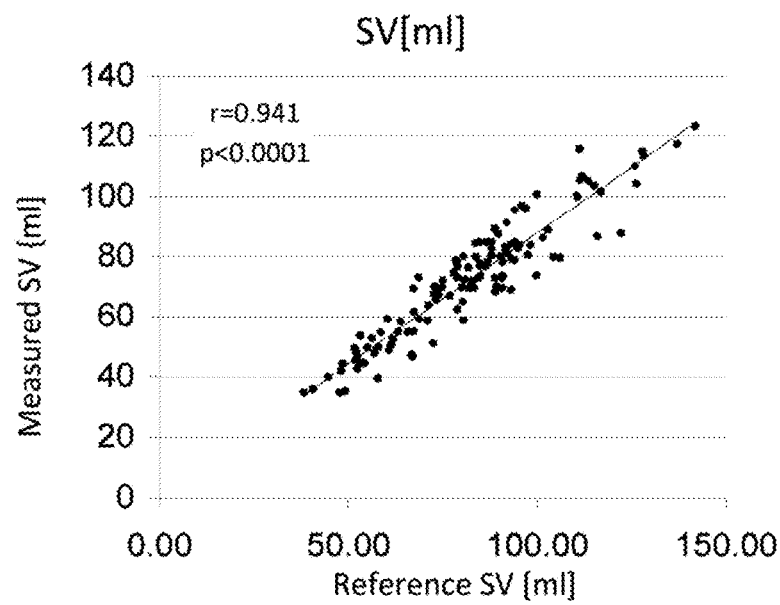
Figure 12D:
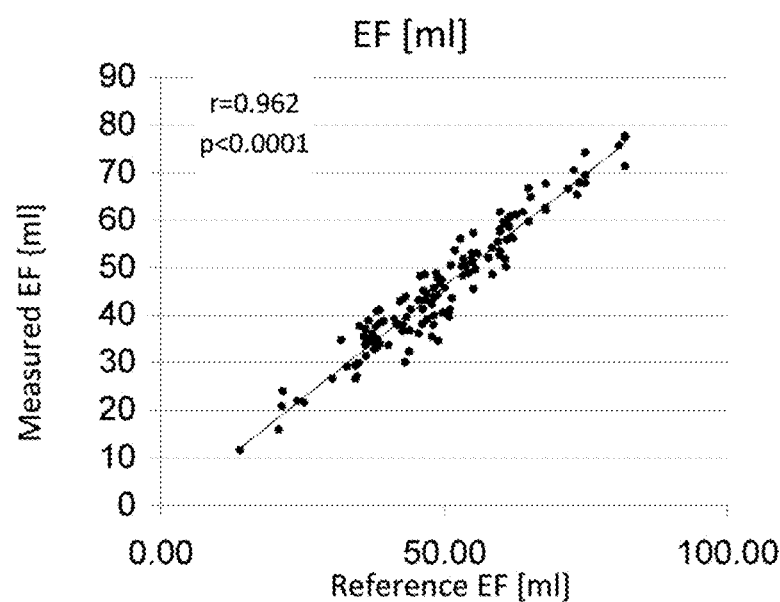
Figure 13A:
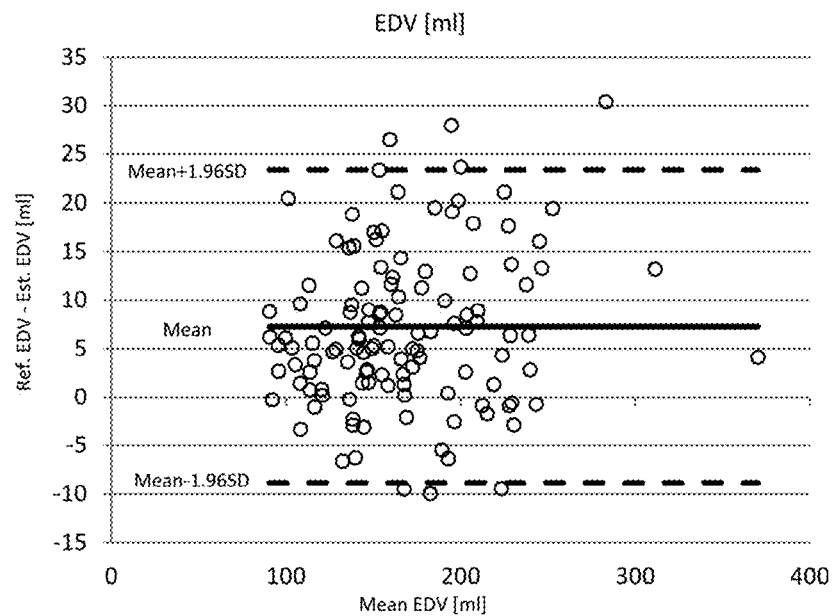
FIGS. 13A-13D are a series of graphical illustrations showing a comparison of clinical parameters as determined by the gold standard and the segmentation method in Example 1 of the present invention.
Figure 13B:
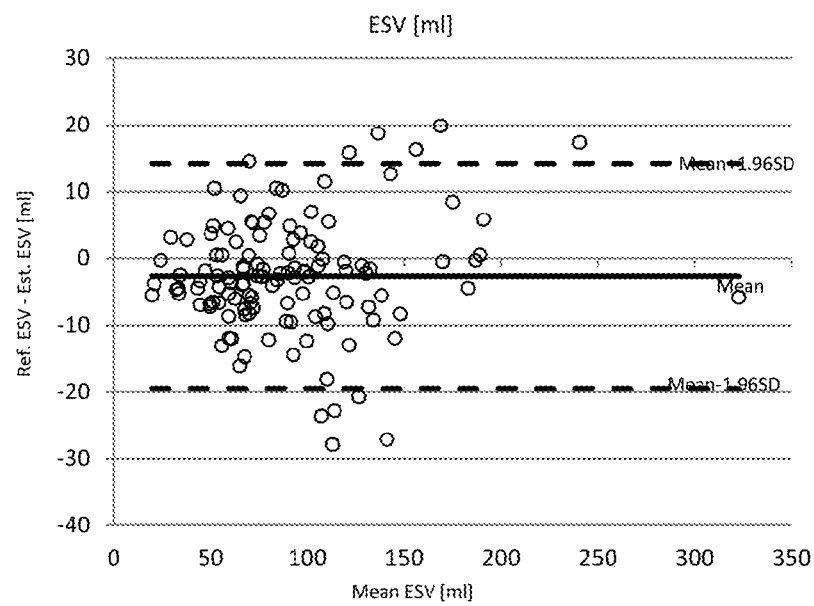
Figure 13C:
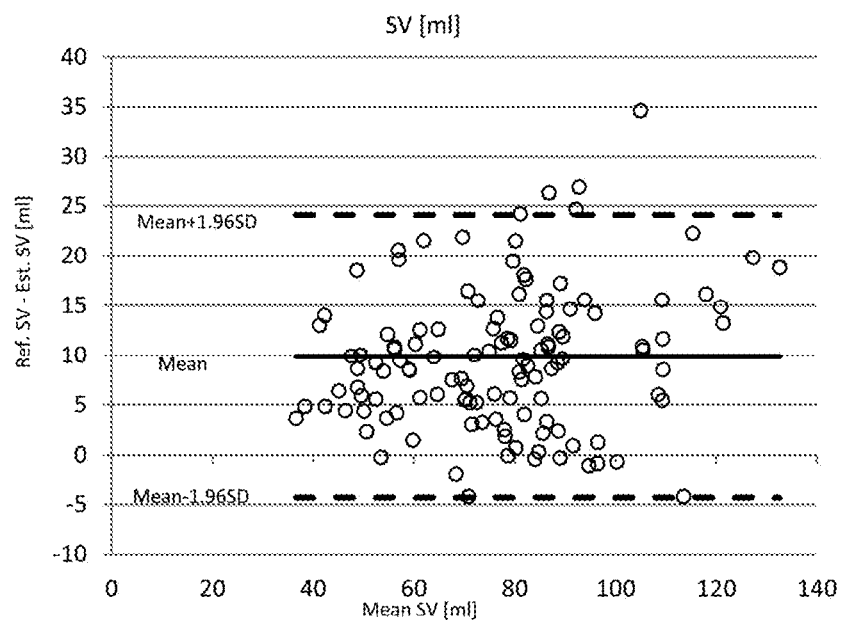
Figure 13D:
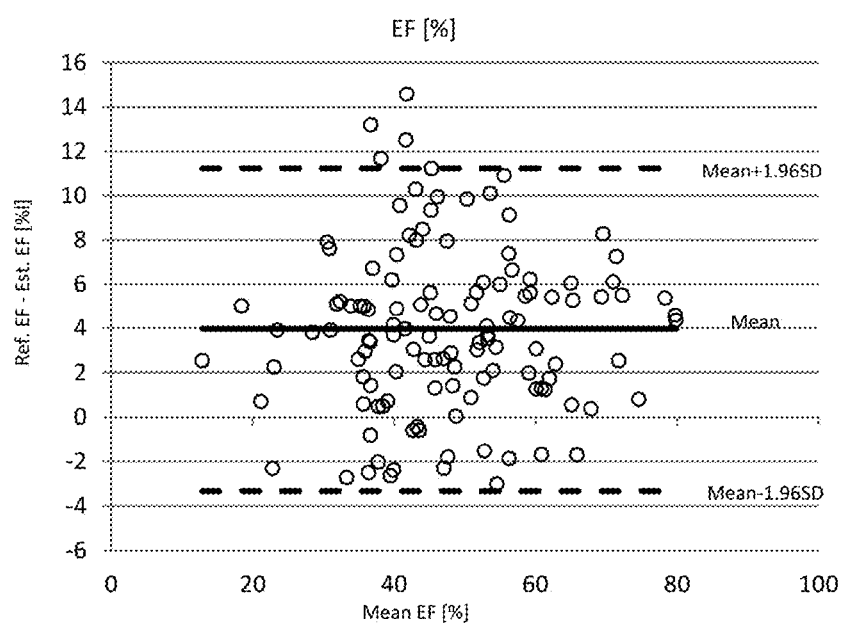

The process outlined in steps V-VII is depicted in FIG. 11. Although the shape of the ventricle is not circular, it is a reasonable assumption that the endocardial boundary is ellipsoid, in case where the papillary muscles (PM) and trabeculae are excluded from the myocardium. The purpose of the assumption in step III above is to obtain a good separation at the end of the process between endocardial edges and PM and trabeculae edges on the polar image that was constructed in step IV.

Transforming the image to polar representation provides an important advantage, since in this representation the endocardial border obtained the shape of a vertical line, specifically near the papillary muscles, where the line of segmentation has to cross between the papillary muscle and the endocardium. This desirable path is also the shortest one, which connects the start and end points, which were detected in step IV.

Since it was assumed that the grey-level intensity at the LV cavity is usually higher than at the myocardium, in step V above only edges with negative horizontal gradients were given non-zero weight. This property of the weighted map means that it is possible for the shortest path algorithm to track only the path along the edge between the papillary muscle and the endocardium, as seen in FIG. 11. Weighting the horizontal edges with zero value prevents the shortest path algorithm from detecting wrongly the edge between the LV cavity and the papillary muscle. This undesired edge is marked by a black vertical arrow 78 in FIG. 11 (left side). It can also be seen in FIG. 11, on the left side, that although part of the inner side of the papillary muscle was detected by the Canny detector (green line), the shortest path crosses correctly between the papillary muscle and the endocardium (the inner layer of the myocardium).

Segmentation of the Epicardium: Once the segmentation of the endocardium was completed, the epicardium could be segmented in the same (first) frame of the cine. The steps of the algorithm are the same as steps III-VII of the endocardial segmentation, with a few modifications:

I. In step III, the radial lines originate from a convex curve created by applying a convex hull algorithm to the endocardial boundary, which was detected in the previous steps.
II. No edges are deleted in step 5.

Tracking of Endocardial and Epicardial points: The second stage of the algorithm included tracking of the endocardial and epicardial points, which were detected in the first frame of the MR cine, along the whole cine. The tracking was based on a motion field derived by an image registration procedure between subsequent frames. Each frame of the cine was warped to best match its subsequent frame, and then this warping field was used to determine the location of the points in the registered frame. Since the object to be registered was assumed to be elastic, a non-rigid registration technique was chosen to warp the frames. In short, the authors proposed a hierarchical transformation model which was meant to capture the global and local motion of the object. The global object motion was modeled by an affine transformation, while the local object motion was described by a free-form deformation (FFD) based on B-splines. This combined transformation, say T has been formulated as:

$$T(x,y) = T_{global}(x,y) + T_{local}(x,y)$$

The global motion model described the overall motion of the heart and its surrounding tissues. A general class of transformation was selected for modeling this motion—an affine transformation, which has 8 degrees of freedom. The local deformation of the heart was described via an FFD model, based on B-splines. The basic idea of FFD is to deform an object by manipulating an underlying mesh of control points. The resulting deformation produces a smooth and continuous transformation. The FFD can be written as product of 1-D cubic B-splines:

$$T_{local}(x, y) = \sum_{l=0}^{3} \sum_{m=0}^{3} B_l(u) B_m(v) \phi_{i+l, j+m}$$

Where $\varphi_{i+l,j+m}$ are control points and $B_l$ represents the $l^{th}$ basis function of the B-spline $B_0(u) = (1-u)^3/6$ $B_1(u) = (3u^3 - 6u^2 + 4)/6$ $B_2(u) = (-3u^3 + -3u^2 + 3u + 1)/6$ $B_3(u) = u^3/6$ The mesh of control points act as parameters of the B-spline FFD and the degree of non-rigid deformation, which can be modeled depending on the resolution of the mesh. In order to get the best tradeoff between the degree of non-rigid transformation required to model the motion and its computational cost, a hierarchical multi-resolution approach was used, in which the resolution of the control mesh was increased, along with the image resolution, from coarse to fine.

The non-rigid registration was configured with the following settings: 4 pyramid levels, similarity metric was the squared pixel distance, spacing between control points in the finest level was 2 pixels. Once the transformation field was computed for each frame, the displacement of the endocardial points between subsequent frames could be computed through the transformation function.

Algorithm Validation and Statistical Analysis: The proposed algorithms for segmentation and tracking were validated against a 'gold standard'. This comparison was done for a relatively large number of clinical cases, to test the hypothesis that the segmentation output from the proposed algorithms was not statistically different from the gold-standard.

The second step included evaluating the algorithm results against the 'gold standard'. The evaluation was done in two ways: first the clinical parameters, derived from the boundaries were compared, and then the boundaries themselves were compared. The derived parameters were the end-diastolic volume (EDV) and the end-systolic volume (ESV), Stroke Volume (SV)—the volume of blood pumped from the LV at each beat, and the Ejection Fraction (EF), the fraction of the blood pumped out of the LV, defined as:

$$EF = \frac{ED - ES}{ED}$$

These volumes were calculated according to biplane method of disks (modified Simpson's rule), in the apical 4CH and apical 2CH views. To assess the error of these parameters, the absolute difference was used between the measured parameters (based on the segmentation) and the 'gold standard' parameters. The accuracy of measuring these clinical parameters is one of the clinical goals of the image segmentation.

In order to compare the segmentation error directly, corresponding points on the given curves (manual contours drawn by the two observers, the 'gold standard', and the automatically drawn contours) had to be established. An algorithm which iteratively refines an initial correspondence was used, by intersecting the original curves with lines perpendicular to an average curve calculated from the corresponding pairs of the previous iteration. Once the corresponding points on both curves were established, mean absolute distance—Error$_{mean}$ was used, to estimate the error between the curves.

The segmentation errors were summarized, in term of mean±standard deviation, for eight groups according to their location, phase and view. The errors were calculated between the automatic segmentation and the 'gold standard' tracing ($\delta_1$) and between the two manual tracings of 26 patients from the first dataset source ($\delta_2$), which was used for inter-observer variability assessment. The comparison between $\delta_1$ and $\delta_2$ was evaluated using paired two-tailed Student's t test. P values<0.01 were considered statistically significant. The goal was to achieve $\delta_1$ which would at least not be significantly larger than $\delta_2$. Bland-Altman analysis (bias between the two methods, as well as the upper and lower 95% limit of agreement) was used to assess the agreement between the clinical parameters. The statistical analysis was performed using SPSS software (version 21.0, SPSS Inc, Chicago, Ill., USA).

Results:

Clinical Parameters: Table 2 summarizes the absolute errors of the clinical parameters. FIGS. 12A-12D show the strong correlation between the 'gold standard' and the measured parameters provided by the segmentation algorithm. These results demonstrate the accuracy of the method in assessing important clinical parameters. These parameters are correlated well with the 'gold standard' parameters. Correlations between the reference myocardial volumes and the measured volumes were r=0.985 and r=0.982 for ED volume and ES volume, respectively, as noted in FIGS. 12A-12D. The Bland-Altman plot depicted in FIGS. 13A-13D, which compares all the clinical parameters determined by the 'gold standard' and by the segmentation algorithm, shows a good level of agreement, without systematic overestimation or underestimation. Bias between the methods (mean inter-method difference) was 7.26 ml, −2.63 ml, 9.89 ml, 3.96% and the standard-deviation of the differences was 8.21 ml, 8.58 ml, 7.25 ml and 3.72% for EDV, ESV, SV and EF, respectively.

TABLE 2

|  | Absolute error (ml) | Correlation Coefficient (r) |
| --- | --- | --- |
| EDV (ml) | 8.51 ± 6.89 | 0.985 |
| ESV (ml) | 6.83 ± 5.80 | 0.982 |
| SV (ml) | 10.11 ± 6.94 | 0.941 |
| EF (%) | 4.45 ± 3.11 | 0.962 |

Segmentation Error: The segmentation results were validated by comparing them to the 'gold standard' boundary tracing. First the two manual tracings were compared ($\delta_2$) in order to establish an inter-observer variability, then the automatic segmentation was compared to the 'gold standard' ($\delta_1$). The mean and standard deviation of the mean absolute distance of these groups are depicted in Table 3. Comparisons were made in sub-groups at different cardiac phases and acquisition views. Table 3 shows clearly that the segmentation error is not higher than the inter-observer error and these two error groups are not significantly different. Table 4 shows the spread of the segmentation error reported by previous studies that participated in the MICCAI '09 challenge using dataset from Sunnybrook health Sciences centre, and the error of the current study.

TABLE 3

|  |  | $\delta_1$(N = 126) [mm] | $\delta_2$(N = 26) [mm] | p-value $\alpha$ = 0.01 |
| --- | --- | --- | --- | --- |
| 2-chamber | ED endo. | 1.07 ± 0.39 | 1.16 ± 0.25 | 0.22 |
|  | ED epi | 0.93 ± 0.32 | 1.07 ± 0.30 | 0.04 |
|  | ES endo. | 1.43 ± 0.48 | 1.19 ± 0.33 | 0.02 |
|  | ES epi. | 1.24 ± 0.42 | 1.01 ± 0.34 | 0.02 |
| 4-chamber | ED endo. | 1.04 ± 0.39 | 1.16 ± 0.32 | 0.17 |
|  | ED epi | 0.96 ± 0.30 | 1.06 ± 0.73 | 0.19 |
|  | ES endo. | 1.63 ± 0.71 | 1.33 ± 0.32 | 0.04 |
|  | ES epi. | 1.29 ± 0.38 | 1.09 ± 0.31 | 0.02 |

TABLE 4

|  | View | Nb Subj. | Mean errors-endo [mm] | Mean errors-epi [mm] |
| --- | --- | --- | --- | --- |
| Casta et al. 2009 | SAX | 15 | 2.72* | — |
| Wijnhout et al. 2009 | SAX | 15 | 2.29* | 2.28* |
| Lu et al. 2009 | SAX | 15 | 2.07 ± 0.61 | 1.91 ± 0.63 |
| Marak et al. 2009 | SAX | — | 3 ± 0.59 | 2.6 ± 0.38 |
| Constantinides et al. 2009 | SAX | 30 | 2.04 ± 0.47 | 2.35 ± 0.57 |
| Jolly et al. 2009 | SAX | 30 | 2.26 ± 0.59 | 1.97 ± 0.48 |
| Huang et al. 2009 | SAX | 30 | 2.06 ± 0.39 | 2.11 ± 0.41 |
| O'Brien et al. 2009 | SAX | 30 | 3.73* | 3.16* |
| Our method | 2CH | 126 | 1.25 ± 0.47 | 1.09 ± 0.40 |
| Our method | 4CH | 126 | 1.33 ± 0.64 | 1.13 ± 0.38 |

Example 2: Myocardial Strain Assessment by Cine Cardiac Magnetic Resonance Imaging Using Non-Rigid Registration Validation of a Tool for assessment of longitudinal strain in standard CMR sequences was performed. The method was validated with TMRI and compared to speckle tracking echocardiography (STE) and to the extent of scar tissue.

Methods: A total of 67 individuals were included in this study. The validation group consisted of 15 patients with previously diagnosed myocardial infarction (mean age 69±12 years, 14 males) and 15 healthy volunteers without clinical history of cardiac disease (mean age 27±5 years, 12 males). All these subjects underwent CMR and TMRI for reference strain analysis (two sources: Cardiac Atlas Project, STACOM 2011 challenge and The University of Queensaland, Brinsbane, Australia). The second group was used for the comparison stage of the study. This group included 37 patients (mean age 67±14 years, 28 males), with previously diagnosed myocardial infarction, which underwent CMR for the definition of myocardial viability (source: Aachen University Hospital RWTH Aachen, Aachen, Germany). LGE-CMR was performed in all these patients and 2D echocardiography with myocardial deformation imaging was performed in 36 of these patients. The time interval from echocardiography to MRI was 4.8±7.7 days. Difference in heart rate between CMR and echocardiographic datasets was 6.5±5.5 bpm.

Cine cardiac magnetic resonance imaging: The cine CMR datasets were acquired during breath-hold on ECG gated MRI scanner (Philips, Intera/Achieva, Best, the Netherlands and Siemens, Sonata, Erlangen, Germany) at field strength of 1.5 Tesla for the patients' group and 3 Tesla scanner for the healthy volunteers' group. 2D+time cine slices, with steady state free precession (SSFP) protocol, were used for imaging the left ventricle (LV) at a temporal resolution of 21 to 66 frames/s. 5-8 mm thick slices were acquired in two apical planes: apical four-chamber (4CH) and two-chamber (2CH) views. Apical long axis (Aplax) view was not included in this study since it was not available for the TMRI datasets. As a result, validation for this view could not be performed. Scan parameters were as follows: repetition time, 2.7-47 ms; echo time, 1.33-1.76 ms; spatial resolution of (1.14-1.60)×(1.14-1.60) mm$^2$; flip angle, 39°-60°.

2D Tagged magnetic resonance imaging: The TMRI datasets were acquired at the same location as the SSFP images, during—breath-hold, with a tag separation of 7-8 mm. Scan parameters were as follows: temporal resolution of 20-37 frames/s; repetition time, 6.8-48.0 ms; echo time, 3.14-3.70 ms; spatial resolution of (0.96-1.48)×(0.96-1.48) mm$^2$, flip angle, 8°-20°) A respiratory navigator was used to compensate for any respiratory miss-alignment during the acquisitions.

Contrast-enhanced magnetic resonance imaging: All patients underwent LGE-CMR with a 1.5 T whole-body MR scanner (Intera, Best, Philips, the Netherlands) using a five-element phased-array cardiac coil with the patient placed supine. After 15 min of intravenous injection of 0.2 mmol/kg body weight Gd-DTPA (Magnevist, Schering, Berlin, Germany), 8 mm long-axis slices were acquired with a prospective electrocardiogram (ECG)-gated gradient echo sequence, with an inversion pre-pulse, in the same projections as the CMR, to allow assessment of scar extent.

Echocardiography: For each patient, echocardiography was performed using a commercially available standard ultrasound scanner (Vivid 7, Vivid S6, Vivid E9 or Vivid i, General Electric Healthcare Inc., Horten, Norway) with a 2.5-MHz transducer. Conventional apical four-chamber, two-chamber and three-chamber views were obtained and digitally stored for subsequent analysis. All the images were obtained at a frame rate of 30-98 frames/s.

Data Analysis: For measurement of longitudinal strain in TMRI, CMR and echocardiography, as well as for measurement of scar tissue, the ventricle in each view was divided into 6 segments (4CH: basal inferoseptum, mid inferoseptum, apical septum, apical lateral, mid anterolateral and basal anterolateral; 2CH: basal inferior, mid inferior, apical inferior, apical anterior, mid anterior and basal anterior).

Analysis of MRI data was performed off-line using dedicated software (Matlab version 8.1, The MathWorks, Inc., Natick, Mass., USA). Analysis of echocardiographic datasets was done using standard software package (EchoPAC PC SW Only, version BT12, GE Healthcare, Horten, Norway and Haifa, Israel).

Identification of scar on LGE-CMR: For comparison of strain values and delayed enhancement imaging, each myocardial segment was evaluated for the presence of hyper-enhancement. The definition of hyper-enhancement was based on a Full-Width at Half-Maximum (FWHM) criterion. According to this criterion the maximum signal intensity (MX) within the myocardium is identified and segmented, and the myocardial infarct (MI) is identified as the area presenting a signal intensity 50% above the MX (MI≥MX*0.5).

Areas of microvascular obstruction (MVO), defined as subendocardial hypo-enhanced (dark) regions surrounded by hyper-enhancement, were included as part of the infarct.

The segmental extent of hyper-enhancement was defined as the percentage of contrast-enhanced area as compared to the total myocardial area. The transmural extent was then classified into 3 categories, as described by Kim et al: no scar was defined by 0% hyper-enhancement; non-transmural infarction (subendocardial infarct) was defined by 1-50% of the area being hyper-enhanced, while transmural infarction was defined by 51-100% of the area being hyper-enhanced.

Myocardial strain measurements using tagged MRI: In order to generate ground truth strain measurements from TMRI datasets, 13 landmarks were selected for the first frame of each cine TMRI, where each even landmark divides each segment to two sub-segments. Each landmark was placed on the intersection of the tag lines close to the mid-wall of the myocardium (the line that crosses along the myocardium in the middle between the Epicardium and endocardium). Then, the landmarks were manually tracked by an expert observer throughout the entire cardiac cycle. The Lagrangian strain between each neighboring landmarks was calculated for each sub-segment as:

$$\varepsilon_{Long} = \frac{(L - L_0)}{L_0} \times 100\%,$$

where $L_0$ is the Euclidean distance between neighboring landmarks, at the first frame. The final step was averaging of the two sub-segmental strain values, to obtain segmental measurements.

Myocardial strain measurements using speckle-tracking echocardiography: For each view, the software automatically placed a curve along the endocardial border in the apical long axis view at the end-systolic frame, which was defined by the aortic valve closure (AVC). This curve could be adjusted manually, if necessary. Next, the software generated a region of interest (ROI) to cover the myocardial thickness along the entire length of the LV wall. The software then automatically tracked the speckles frame-by-frame throughout the cardiac cycle, using the sum of absolute differences method.

The LV was automatically divided, at each view, into 6 segments, and a tracking-quality (TQ) score was obtained for each segment. The TQ scores define the quality of the speckle tracking algorithm, ranging between 1.0 (excellent tracking) and 3.0 (poor tracking). Segments with poor tracking quality (TQ≥3), where excluded.

Algorithm for myocardial strain measurements using cine cardiac MRI: The algorithm included three steps: Segmentation of the endocardium and epicardium at the end diastolic frame; tracking of endocardial and epicardial points throughout the entire cardiac cycle; and calculation of the longitudinal strain in the mid-myocardial layer.

Figure 14:
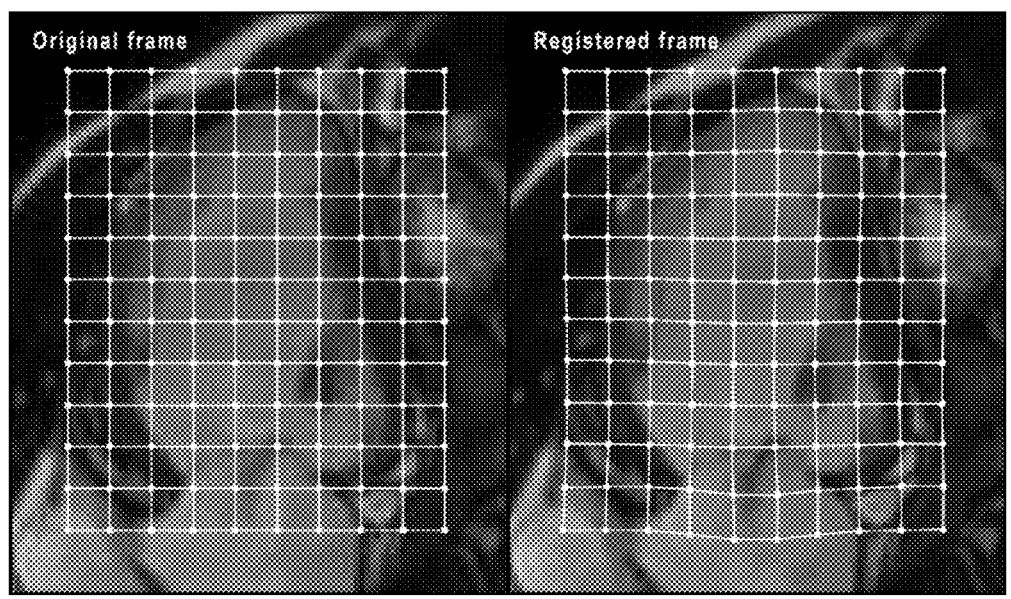
FIG. 14 is a photographic illustration depicting a deformation map of a single frame, in accordance with methods of the present invention.

The first two steps of the algorithm were described in Example 1 above. Briefly, the algorithm was proposed for segmentation of the endocardium and epicardium at the end diastolic frame and then for tracking the points on these boundaries throughout the entire cardiac cycle. The segmentation of the first frame was based on edge detection of the gradient map, using a Fast Marching method. Tracking of these points was done by using temporal non-rigid registration of subsequent frames. Example of deformation of a single frame is illustrated in FIG. 14. Given this deformation map, the translation of each point to the next frame could be derived.

Figure 15:
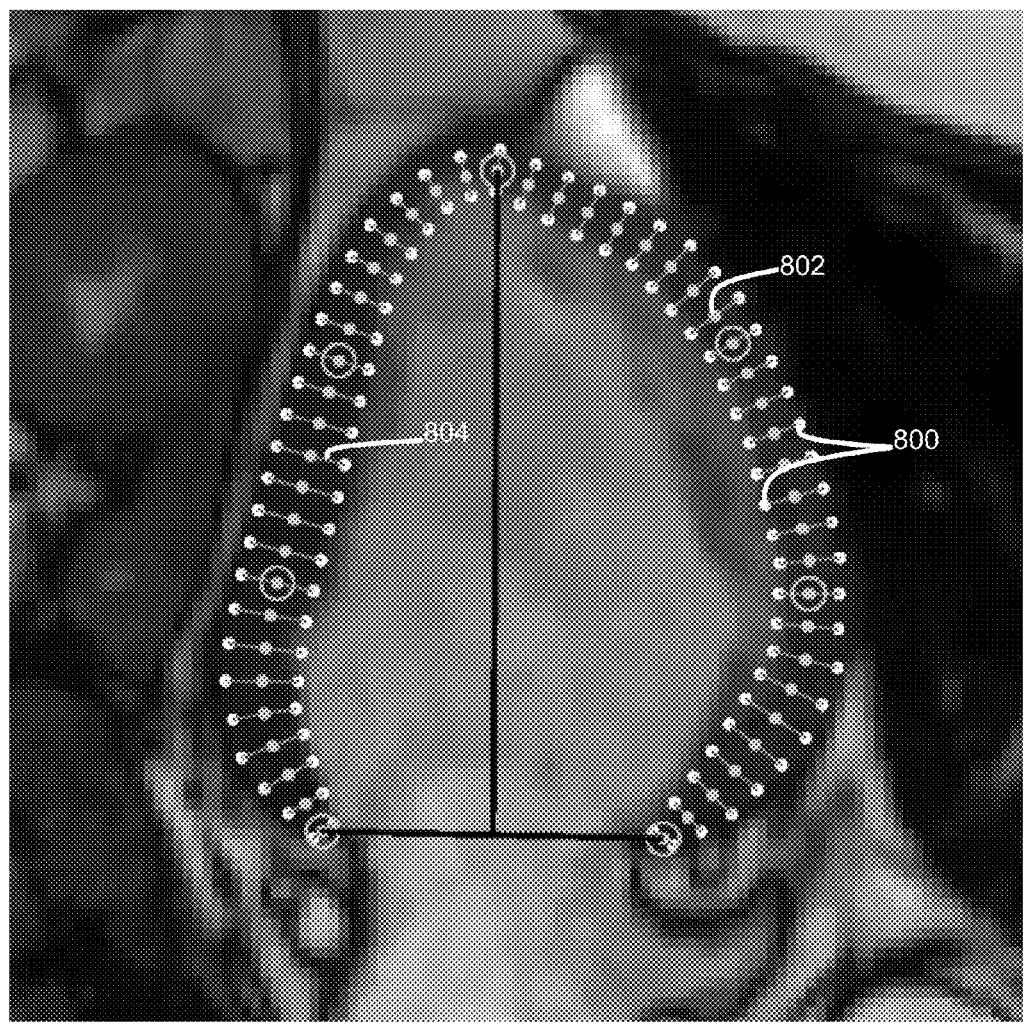
FIG. 15 is a photographic illustration showing correspondence between endocardial and epicardial borders, in accordance with methods of the present invention.
Figure 16A:
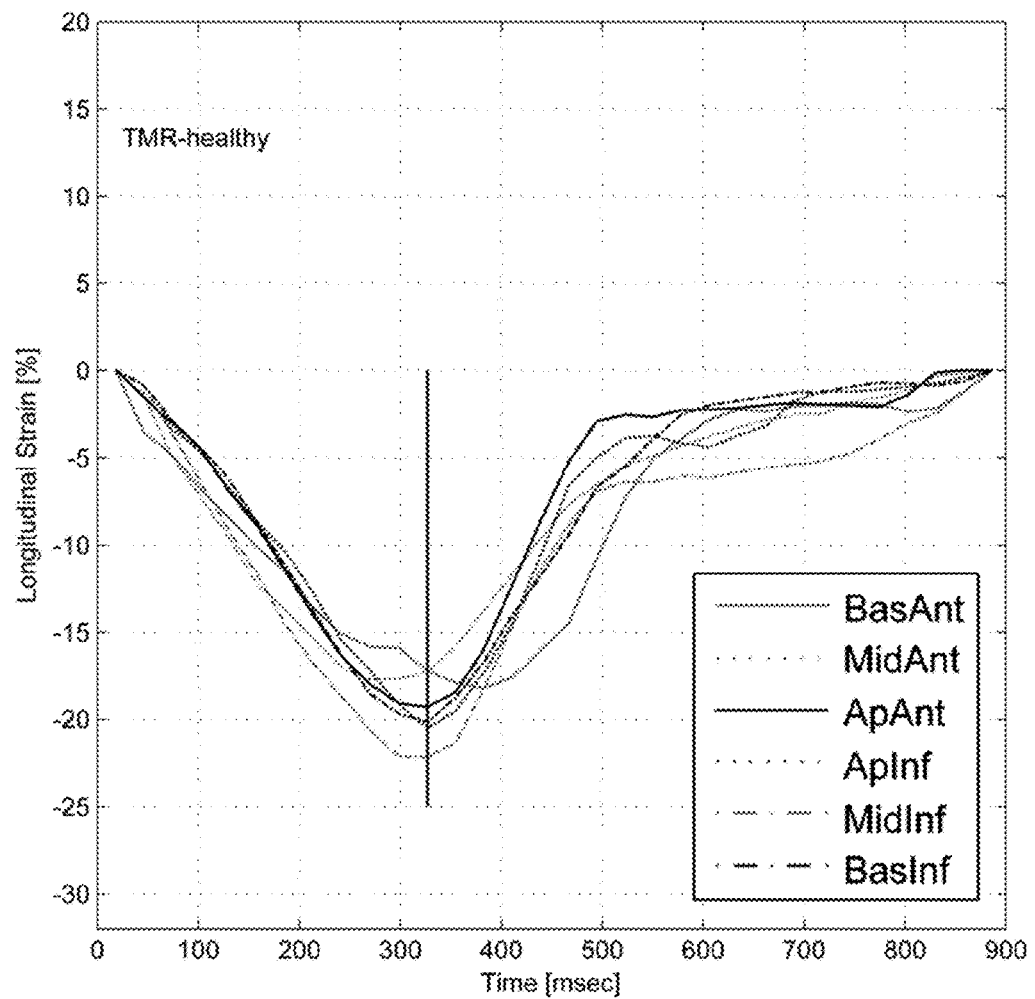
FIGS. 16A-16D are a series of strain curves obtained by cardiac magnetic resonance (CMR) and tagged magnetic resonance imaging (TMRI) in healthy volunteers and post-myocardial infarction patients.
Figure 16B:
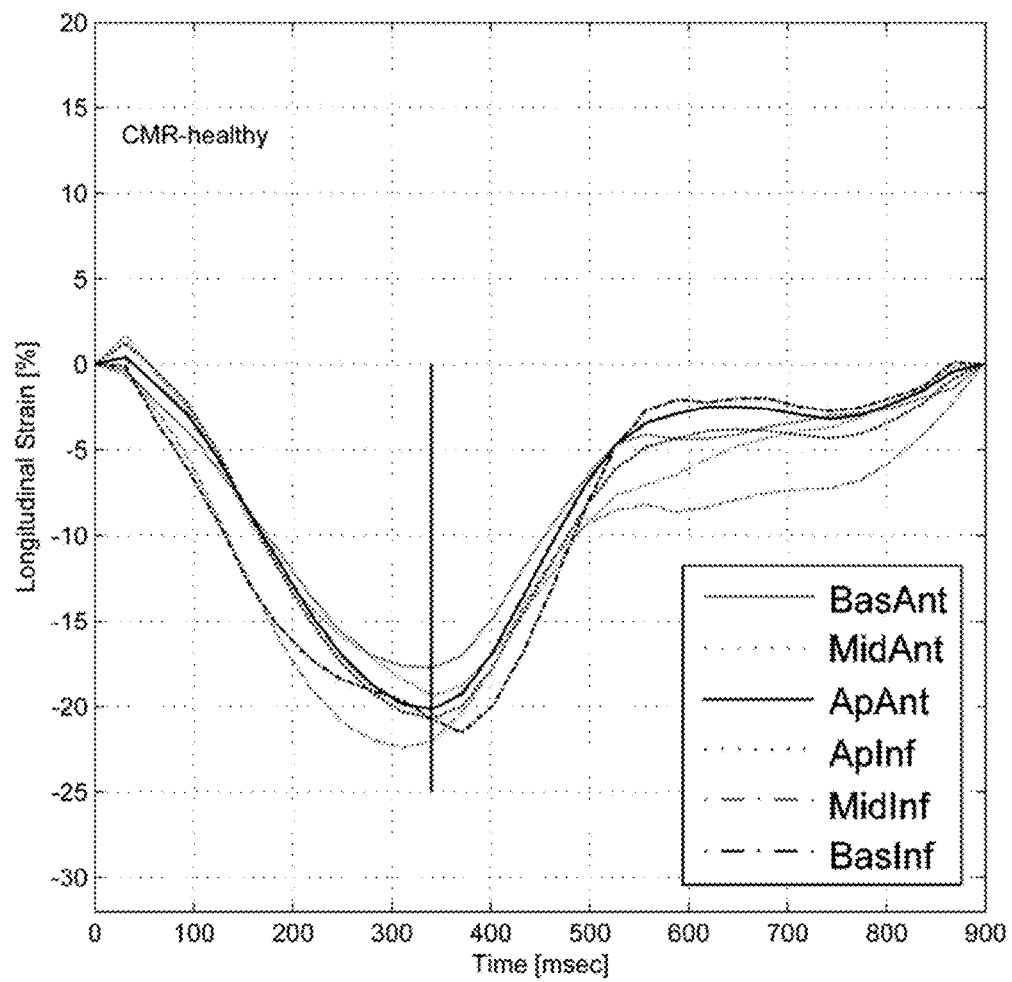
Figure 16C:
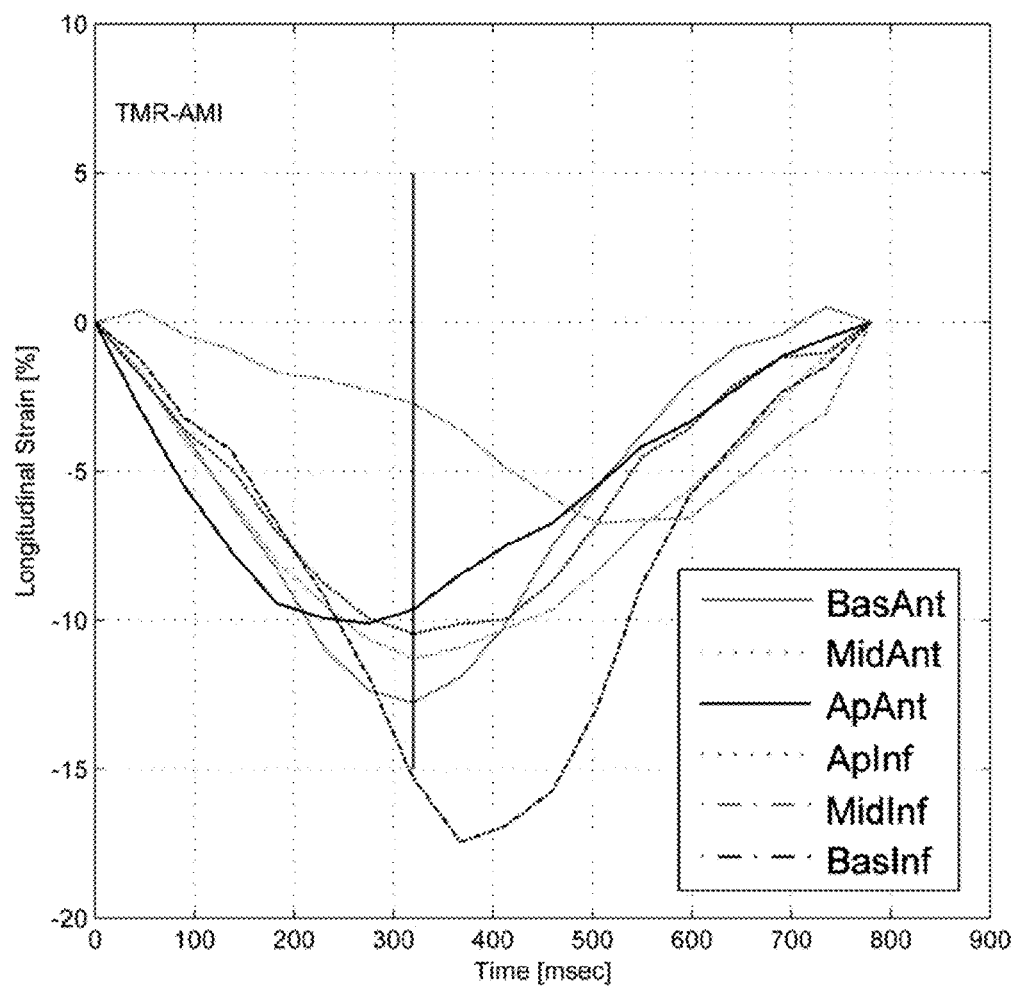
Figure 16D:
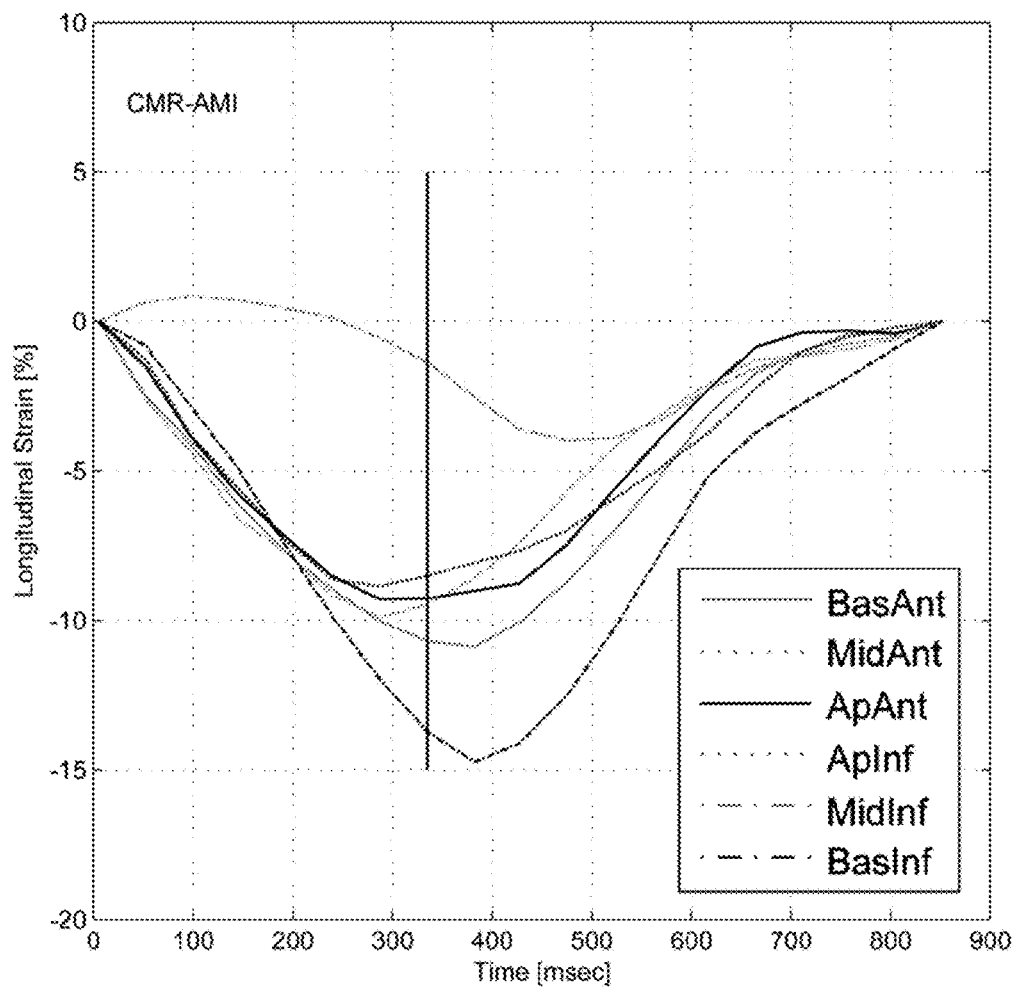

The mid-myocardial longitudinal strain was calculated between points in the mid-axis of the myocardium. Each of these points was defined as a centroid of two corresponding points (CP), one on the endocardial border and the other on the epicardial. In other words, each point on the mid-myocardium is an average of its CP. This correspondence between the endocardial and the epicardial borders is established prior to the tracking, and was applied according to the iterative procedure proposed by Chalana & Kim. These points are illustrated in FIG. 15.

The algorithm for strain estimation is described in the following steps:
1. Apply automatic segmentation of the endocardium at the first frame, as described above with reference to Example 1.
2. Establish N pairs of CP on endocardial and epicardial boundaries (N=50 in the current study (points 800 in FIG. 15), connected by green lines, to demonstrate the correspondence).
3. Apply tracking of all CP throughout the entire cardiac cycle, as described above, with reference to Example 1.
4. Average the coordinates, within the image plane, of each pairs of CP for each frame, to obtain the position of the centroid points (centroid points 802 in FIG. 15).
5. Calculate the distance between subsequent centroid points (in the arc length direction), for each frame, using spline approximation.
6. Calculate the Lagrangian strain between each neighboring centroid points at each frame t which is defined as $$\varepsilon^{i,t} = \frac{(L^{i,t} - L_0^i)}{L_0^i} \times 100\%,$$

where $L_0^i$ is the initial distance between point i and point i−1 (at the end diastolic frame) and $L^{i,t}$ is the distance difference between point i and point i−1 at frame t. i is the arc length index of the point.
7. Apply temporal (time direction) and spatial (arc length direction) smoothing of the strain measurements, using a low pass filter (size of temporal filter=3, size of spatial filter=5).
8. Calculate the tracking quality $Q^i$ which is a function of the registration error between subsequent frames. These error maps were interpolated at the location of the CP to obtain their values. Given the registration error in the CP locations:

The tracking quality is defined as:

$$Q^i = 1 - \frac{E^{i,t}}{M}$$

Where:

$$E^{i,t} = \max(\text{error}_{endo}^{i,t}, \text{error}_{epi}^{i,t})$$

error—registration error
i—CP index
t—frame index
M—maximal error in frame t
9. Divide the myocardium into 6 segments, based on curve length: 3 segments with equal length on each side of the LV wall, with respect to the apical point. This apical point was defined as the intersection point of the mid-myocardial axis and the line perpendicular to the line that connects the two basal points, and originating from its center. These lines 804 are shown in FIG. 15, and the segments' end points are marked as points 800.
10. Calculate the strain of each segment using weighted average of values of its centroid points. The tracking quality values were used as weights.

Examples of strain curves obtained by CMR and TMRI in healthy volunteers and post-MI patients are given in FIGS. 16A-16D. For each modality (TMRI, cine CMR and STE), segmental longitudinal peak systolic strain (in the mid-myocardial layer) was determined as the maximum negative value during systole. In cases where the amplitude of the PSS was smaller than 1.5 times the maximal positive amplitude, the latter was recorded instead (e.g. dyskinetic wall motion). In order to determine the systole interval, end-systolic frame was defined by the AVC in the apical long axis view for the STE datasets. For MRI data, the frame with minimum LV cavity area (volume) was manually defined for each dataset, at the end-systolic frame.

Reproducibility: Interobserver variability of the measurement of CMR strain was evaluated in 10 randomly selected patients (120 segments for longitudinal strain) from both the healthy and the patients groups, by 2 independent observers who were blinded to the results of CMR measurements.

To obtain intra-observer variability, the same observer, who was blinded to the clinical evaluation and to other details, reinterpreted the study two weeks later. Intra-observer and inter-observer reliabilities were analyzed by intraclass correlation coefficient (ICC) and Bland-Altman analysis.

Statistical analysis: Data are expressed as mean±SD. Mid-myocardial strain values obtained with different techniques were compared using paired two-tailed Student's t test, to determine whether the difference in the PSS values between the techniques was statistically significant. Correlation among strain measurements were performed using Pearson correlation coefficient. The relations were determined by linear regression analysis.

Bland-Altman analysis (bias between the two methods, as well as the upper and lower 95% limit of agreement) was used to assess the agreement between the cine CMR and TMRI and STE. Receiver-operating characteristic (ROC) curves were used to evaluate the ability to distinguish segments with no infarction from segments with either non-transmural or transmural infarction, as well as to distinguish transmural from non-transmural infarction in segments with wall motion abnormalities and to determine optimal PSS cutoff values for sensitivity and specificity analysis.

Intra-observer and inter-observer variabilities were evaluated using the inter-class correlation coefficient (ICC). In Bland-Altman analysis, the inter-observer agreements were evaluated and expressed in terms of the mean difference±1.96 times standard deviation.

The statistical analysis was performed using SPSS software (version 21.0, SPSS Inc., Chicago, Ill., USA). P values<0.01 were considered statistically significant.

Figure 17A:
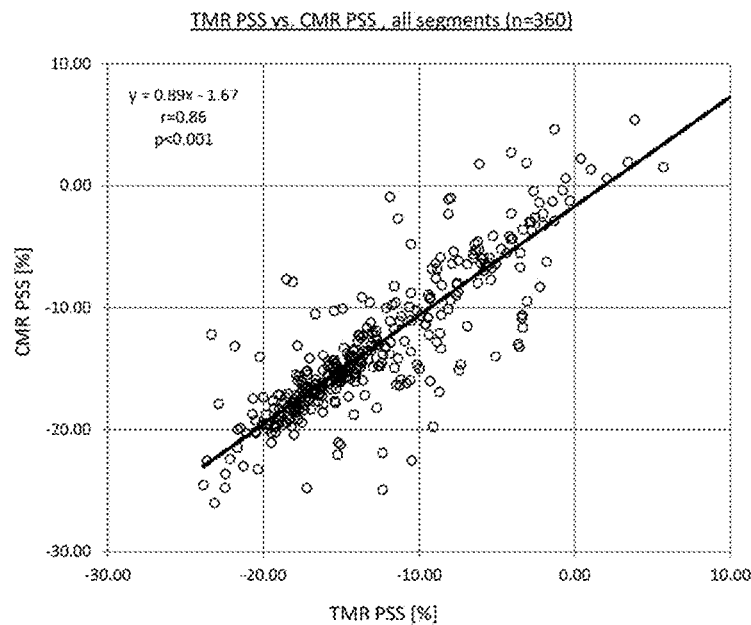
FIGS. 17A and 17B are graphical illustrations showing agreement for longitudinal peak systolic strain (PSS) as measured by cine CMR and TMRI.
Figure 17B:
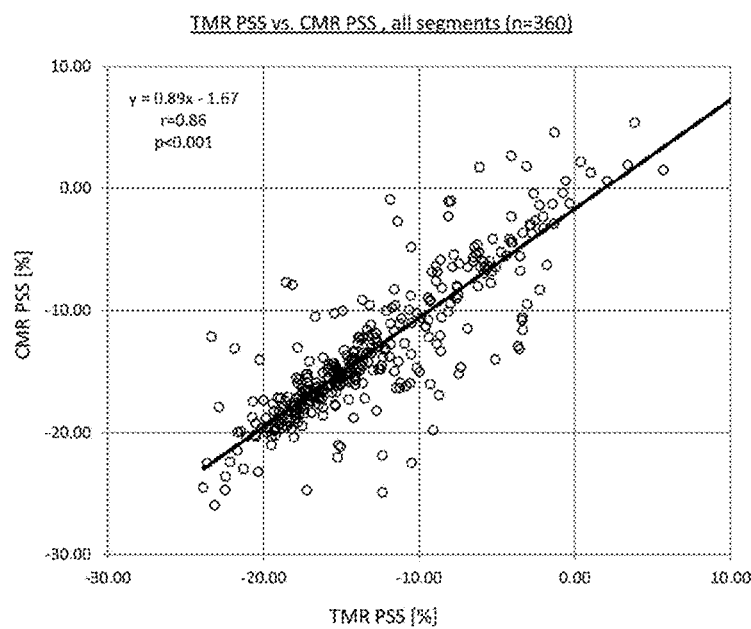

Results:

Comparison of Cine CMR and tagged MRI Strain Measurements: In total, 30 subjects (15 healthy volunteers, 15 post-MI patients) were analyzed resulting in 360 segments. Comparison between longitudinal PSS measured by cine CMR and TMRI yielded a strong correlation (correlation coefficient of r=0.86, p<0.001), as demonstrated in FIG. 17A. The Bland-Altman analysis (FIG. 17B) shows good agreement, with narrow limits of agreements between these techniques (−5.82% to 6.38%). Bias between the methods (mean inter-technique strain difference) was 0.28% and the standard-deviation of the differences was 3.11%. For the healthy volunteer group (control) the mean PSS was −16.96±2.40% and −17.01±2.48% (p<0.001) for TMRI and cine CMR measurements, respectively. For the patients group the mean PSS was −9.01±5.57% and −9.53±6.25% (p<0.001) for TMRI and cine CMR measurements, respectively.

Figure 18A:
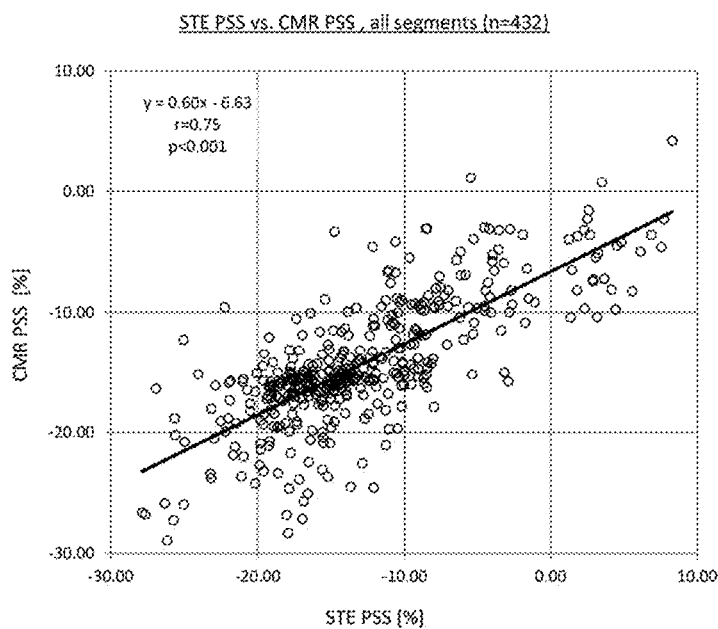
FIGS. 18A and 18B are graphical illustrations showing agreement for longitudinal PSS as measured by cine CMR and endocardiographic strain measurements.
Figure 18B:
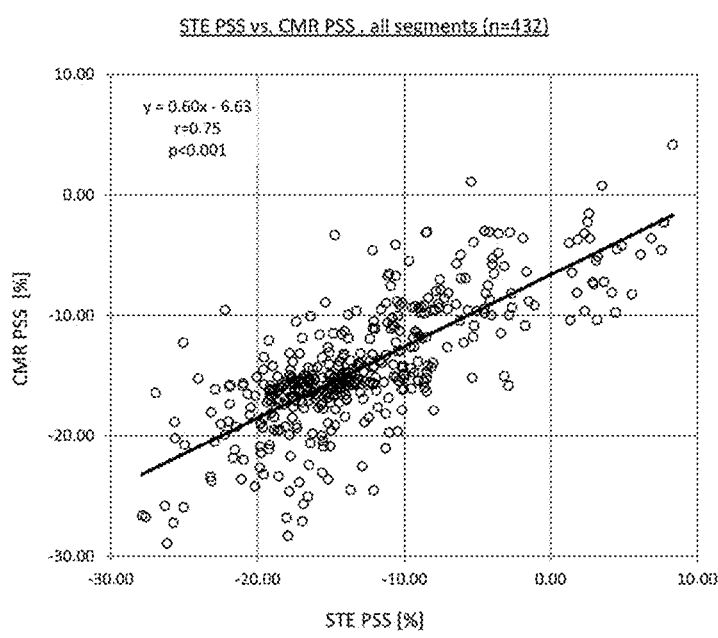

Comparison of cine CMR and echocardiographic strain measurements: In total, 36 patients were analyzed, resulting in 432 segments. 14 segments (3.2%) had to be excluded because of insufficient tracking quality of the echocardiographic datasets. Longitudinal PSS measured by these techniques correlated well (r=0.75, p<0.001) as demonstrated in FIG. 18A. The Bland-Altman analysis which is depicted in the right panel of FIG. 18B, shows good agreement with close limits of agreements between these techniques (−7.27% to 10.17%). Bias between the methods was 1.45% and the standard-deviation of the differences was 4.45%. Table 5 shows modest correlations between the two techniques, dividing the segments into 3 categories according to their scar extent. Mean PSS values were similar in these groups between CMR and STE with no significant difference.

TABLE 5

| Transmurality extent | Number of segments | CMR PSS [%] | STE PSS [%] | r | p-value |
|---|---|---|---|---|---|
| All segments | 444 | −14.34 ± 5.18 | −12.80 ± 6.74 | 0.75 | <0.001 |
| no scar (0% LE) | 320 (72%) | −16.60 ± 3.80 | −15.61 ± 4.40 | 0.52 | <0.001 |
| subendocardial scar (1-50% L LE) | 57 (13%) | −10.24 ± 3.30 | −8.60 ± 5.26 | 0.51 | <0.001 |
| transmural scar (51-100% LE) | 67 (15%) | −7.04 ± 2.83 | −2.65 ± 6.38 | 0.48 | <0.001 |

Myocardial strain as related to extent of myocardial infarction: Among 444 segments acquired from 37 patients, segmental analysis of contrast-enhanced MRI indicated no scar tissue in 320 (72%) segments, 57 (13%) segments were classified as having non-transmural infarction (1% to 50% hyper-enhancement), and 67 (15%) segments were classified as having transmural infarction (51% to 100% hyper-enhancement).

Figure 19:
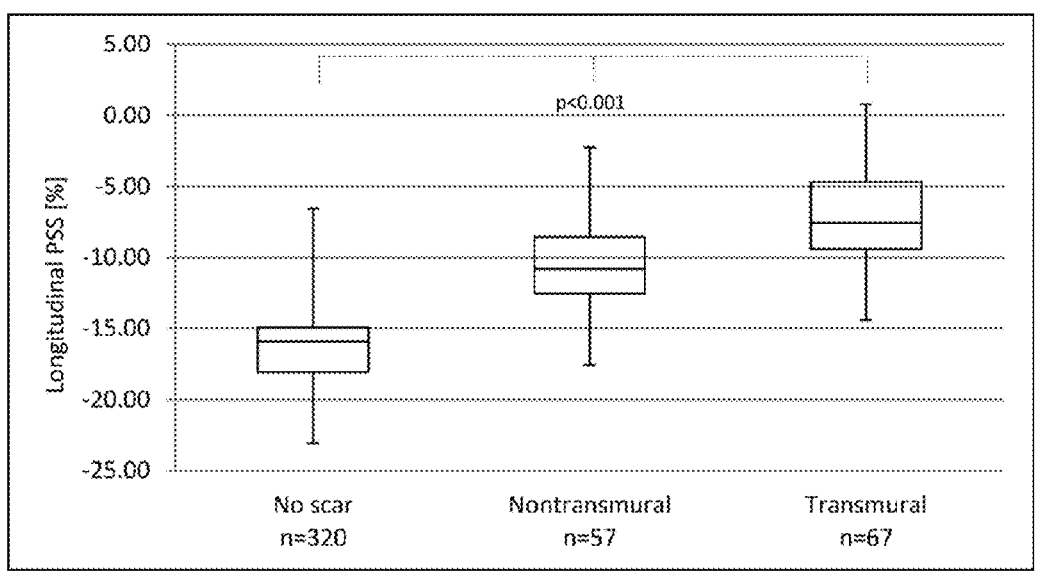
FIG. 19 is a box and whisker diagram illustration of strain values obtained by cine CMR in relation to the extent of scarring.

Significant differences in longitudinal PSS obtained by cine CMR were observed between noninfarcted, non-transmural infarcted, and transmural infarcted segments (p<0.001), as depicted in Table 3, and in the box-and-whisker plot of FIG. 19.

Figure 20A:
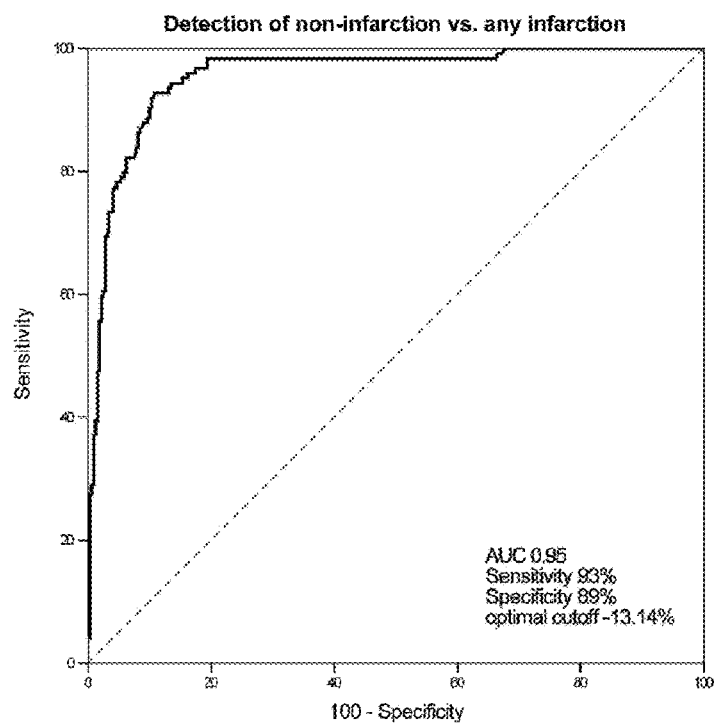
FIGS. 20A and 20B are graphical illustrations of non-infarction versus infarction, and transmural versus non-transmural infarction, respectively.
Figure 20B:
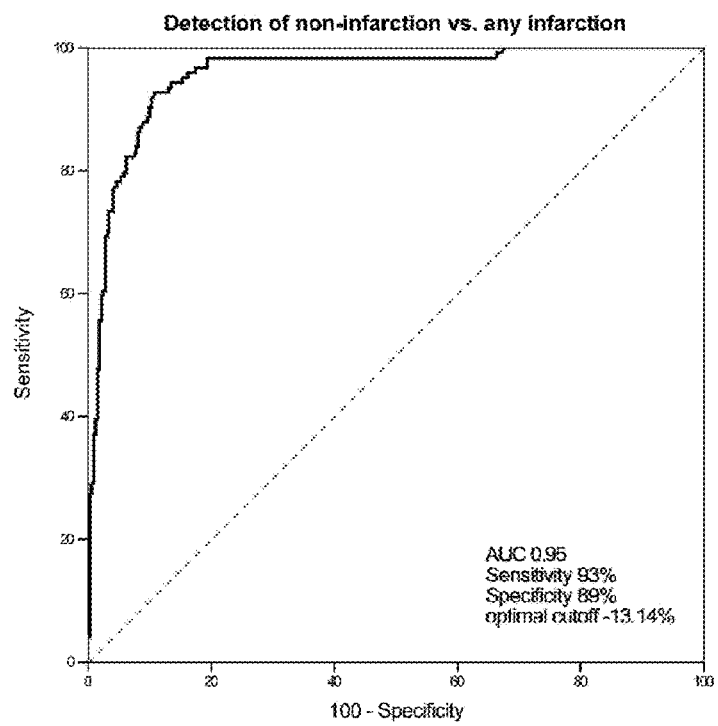

A cutoff longitudinal peak systolic strain of −13.14% differentiated noninfarcted from any infarcted segments, with a sensitivity of 93% and a specificity of 89% (AUC 0.95; 95% CI, 0.93 to 0.97). Longitudinal peak systolic strain achieved a sensitivity of 75% and a specificity of 67% (AUC 0.78; 95% CI, 0.69 to 0.86), to differentiate between segments with non-transmural and transmural infarction, at a cutoff of −9.39%. ROC curves are given in FIGS. 20A and 20B. All statistics are summarized in Table 6.

TABLE 6

| | non-infarction vs. any infarction | non-transmural vs. transmural |
|---|---|---|
| AUC | 0.95 | 0.78 |
| opt. threshold | −13.14% | −9.39% |
| Sensitivity | 93% | 75% |

TABLE 6-continued

| | non-infarction vs. any infarction | non-transmural vs. transmural |
|---|---|---|
| Specificity | 89% | 67% |
| Accuracy | 90% | 71% |
| PPV | 77% | 72% |
| NPV | 97% | 69% |

Reproducibility: A total of 120 segments were evaluated for inter-observer and intra-observer variability for PSS, as measured by cine CMR. The intra-observer variability was excellent with ICC of 0.96. The Bland-Altman limits of agreements were −1.60% to 1.55% with mean difference of −0.02±0.80%. The inter-observer variability was excellent with ICC of 0.90. The Bland-Altman limits of agreements were −1.85% to 1.73% with mean difference of −0.06±0.91%.

The algorithm computation time: The method speed was evaluated. The algorithm was coded in the Matlab environment, and the post-processing was performed on an Intel Core i7 machine, running at 3.4 GHz clock speed with 8 Gigabyte of memory. While the primary step of the algorithm is image registration between two subsequent frames, the computation time of the algorithm depends on the cine length. The total running time for processing a single cine was 3.07±0.62 min., and dividing it by its number of frames yielded an average running time of 5.70±1.28 sec. per frame. Note that the algorithm implementation was not optimized for speed. Further speed improvement could be obtained using multithreading implementation with high-level programming language.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for evaluation of cardiac function, the method comprising:
    providing a first image sequence of the heart;
    providing a second image sequence of the heart, wherein said second image sequence is of a different imaging modality than said first image sequence;
    automatically segmenting said first image sequence;
    processing said second image sequence to temporally and spatially align said first image sequence with said second image sequence; and
    fusing said segmented first image sequence and said processed second image sequence into a fused image sequence, wherein said fusing comprises transforming said processed second image based on said segmented first image.

2. The method of claim 1, wherein an imaging modality of said first image sequence is one of: cine MRI, cardiac CT, LE-MRI, or tagged MRI.

3. The method of claim 1, wherein an imaging modality of said second image sequence is an ultrasound imaging modality.

4. The method of claim 1, further comprising providing a third image sequence of the heart, said third image sequence having a different imaging modality than said first and second image sequences, wherein said fusing further comprises fusing said third image sequence with said first and second image sequences.

5. The method of claim 1, wherein said automatically segmenting comprises:
 marking boundaries of a cardiac muscle taken from a single frame of said first image sequence; and
 propagating said marked boundaries through additional frames of said first image sequence.

6. The method of claim 1, further comprising post-processing said fused image sequence to further extract myocardial mechanical data.

7. The method of claim 6, wherein said post-processing comprises calculating a mid-myocardial longitudinal strain according to strain measurements obtained from said segmented first image.

8. The method of claim 7, wherein said calculating a mid-myocardial longitudinal strain comprises:
 marking boundaries of a cardiac muscle taken from a single frame of said first image sequence;
 propagating said marked boundaries through additional frames of said first image sequence;
 tracking deformation information obtained from said propagating, using a two-dimensional deformation map for each frame; and
 calculating mid-myocardial strain from said tracked deformation points located on endocardial and epicardial boundaries.

9. The method of claim 6, wherein said post-processing comprises calculating a myocardial mechanical property from said image sequence, the calculating comprising:
 marking boundaries of a cardiac muscle taken from a single frame of said first image sequence;
 propagating said marked boundaries through additional frames of said first image sequence;
 tracking deformation information obtained from said propagating, using a two-dimensional deformation map for each frame; and
 calculating the mechanical property from said tracked deformation information.

10. The method of claim 9, wherein said calculated myocardial mechanical property is mid-myocardial strain calculated from a cMRI image sequence.

11. The method of claim 9, wherein said calculated myocardial mechanical property is at least one of: myocardial longitudinal strain rate, velocity and displacement, left ventricle volume, ejection fraction, and left ventricle myocardial mass.

12. The method of claim 9, wherein said tracking deformation information comprises tracking points located on endocardial and epicardial boundaries.

13. The method of claim 1, further comprising evaluating cardiac function based on said fused image.

14. The method of claim 13, further comprising providing a treatment based on said evaluating.

15. The method of claim 14, further comprising post-treatment providing an image sequence using only one of the imaging modalities to evaluate effectiveness of said provided treatment.

16. The method of claim 1, wherein said automated segmentation is a method for segmentation of cardiac images in long-axis view, the method comprising:
 providing an image sequence in the long-axis view;
 selecting a first image frame from said provided image sequence;
 marking at least two points on said selected first image frame;
 segmenting said first image frame based on said marked points; and
 registering said segmented image between successive frames of said provided image sequence to provide said segmented cardiac image in long-axis view.

17. The method of claim 16, wherein said selected first image frame is the first frame in said image sequence.

18. The method of claim 16, wherein said selecting a first image frame is done automatically.

19. The method of claim 16, wherein said marking at least two points is done automatically.

20. The method of claim 16, wherein said marking at least two points comprises marking a mitral valve left hinge point and a mitral valve right hinge point at an end-diastolic image.

21. The method of claim 16, wherein said segmenting comprises finding a minimal path through a weighted map that represents endocardial and epicardial edges in said selected first image frame.

22. The method of claim 16, wherein said registering comprises non-rigid registration.

23. The method of claim 16, wherein said registering comprises:
 warping each frame of said provided image sequence;
 determining location of points in said frame based on said warping;
 modeling global motion of said located points;
 modeling local motion of said located points;
 computing a transformation field for each frame; and
 computing displacement of endocardial points between subsequent frames based on said transformation file.

24. The method of claim 16, wherein said provided image sequence is provided as rotating slices.

25. A system for evaluation of cardiac function, the system comprising:
 a first modality imaging system configured to provide a first image sequence of the heart;
 a second modality imaging system configured to provide a second image sequence of the heart, said second image sequence having a different image modality than said first image sequence;
 a processor for processing said first and second image sequences, the processor comprising:
 a first modality sub-processor for processing said first image sequence, said first modality sub-processor configured to segment said first image sequence;
 a second modality sub-processor for processing said second image sequence; and
 a data fusor for fusing said processed first image sequence and said processed second image sequence and providing fused imaging data from said processed first image sequence and said processed second image sequence by transforming said processed second image sequence based on said segmented first image sequence; and
 a display for displaying said fused imaging data from said processor.

26. The system of claim 25, wherein said first modality imaging system is one of: cine MRI, ultrasound, cardiac CT, LE-MRI, or tagged MRI.

27. The system of claim 25, wherein said second modality imaging system is an ultrasound imaging system.

28. The system of claim 25, further comprising a third modality imaging system which is different than said first and second modality imaging systems, said third modality imaging system configured for providing a third image sequence of the heart, and wherein said data fusor is configured to fuse said third image sequence with said first and second image sequences.

* * * * *